United States Patent
Wang et al.

(10) Patent No.: US 9,083,442 B2
(45) Date of Patent: Jul. 14, 2015

(54) VEHICULAR POWER LINE COMMUNICATION SYSTEM AND SLAVE APPARATUS

(71) Applicant: DENSO CORPORATION, Kariya, Aichi-pref. (JP)

(72) Inventors: Fan Wang, Nagoya (JP); Hironobu Akita, Okazaki (JP); Hirokazu Ooyabu, Nagoya (JP); Yoshie Sugiura, Nagoya (JP); Yuukou Murase, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/173,003

(22) Filed: Feb. 5, 2014

(65) Prior Publication Data

US 2014/0226732 A1 Aug. 14, 2014

(30) Foreign Application Priority Data

Feb. 8, 2013 (JP) .................................. 2013-23302

(51) Int. Cl.
*H04B 3/00* (2006.01)
*H04B 3/54* (2006.01)
*H04B 3/56* (2006.01)

(52) U.S. Cl.
CPC ... *H04B 3/54* (2013.01); *H04B 3/56* (2013.01)

(58) Field of Classification Search
CPC ............. H04B 3/54; H04B 3/542; H04B 3/56
USPC ........................................................ 375/257
See application file for complete search history.

(56) References Cited

U.S. PATENT DOCUMENTS

| | | | |
|---|---|---|---|
| 2001/0028678 A1 | 10/2001 | Kato et al. | |
| 2006/0023796 A1* | 2/2006 | Yanagida et al. | 375/257 |
| 2011/0187321 A1* | 8/2011 | Hirayama | 320/108 |
| 2013/0208775 A1* | 8/2013 | Wang et al. | 375/224 |
| 2014/0153655 A1* | 6/2014 | Abe et al. | 375/257 |

FOREIGN PATENT DOCUMENTS

| | | |
|---|---|---|
| JP | 2005-045327 A | 2/2005 |
| JP | 2005-303632 A | 10/2005 |
| JP | 2006-352849 A | 12/2006 |
| JP | 2008-017185 A | 1/2008 |
| WO | WO 2013011686 A1 * | 1/2013 |

* cited by examiner

*Primary Examiner* — David B. Lugo
(74) *Attorney, Agent, or Firm* — Posz Law Group, PLC

(57) ABSTRACT

In a master apparatus, a reference device generates a reference signal, a power feeding signal generation portion divides or multiples a frequency of the reference signal to generate a power feeding signal, a first communication carrier generation portion divides or multiples the frequency of the reference signal to generate a first communication carrier, a communication signal generation portion generates a communication signal, and a superimposition portion superimposes the communication signal on the power feeding signal. In a slave apparatus, a separation portion separates the superimposition signal into a power feeding signal and a communication signal, a second communication carrier generation portion divides or multiples a frequency of the power feeding signal separated by the separation portion to generate a second communication carrier, and a modulation and demodulation portion modulates and demodulates a data communication signal to be communicated with the master apparatus using the second communication carrier.

11 Claims, 29 Drawing Sheets

VEHICULAR POWER LINE COMMUNICATION SYSTEM AND SLAVE APPARATUS

CROSS REFERENCE TO RELATED APPLICATIONS

The present application is based on and claims priority to Japanese Patent Application No. 2013-23302 filed on Feb. 8, 2013, the contents of which are incorporated in their entirety herein by reference.

TECHNICAL FIELD

The present disclosure relates to a vehicular power line communication system and a slave apparatus.

BACKGROUND

Conventionally, a master apparatus and a slave apparatus communicate with each other. The master apparatus and the slave apparatus each use a reference device such as a crystal oscillator to generate reference frequencies as accurate as possible. However, many communication devices communicate with each other in a vehicle, and the communication devices use respective reference devices to generate reference frequencies. Thus, the accuracies of the reference frequencies generated from the reference devices vary.

If a crystal oscillator is used as the reference device, the reference frequency varies with a change in the environment temperature. The frequency accuracy also degrades due to aging degradation. These characteristics affect the communication quality. To solve this problem, recent reference devices use a temperature compensated crystal oscillator (TCXO) or a circuit to compensate for aging degradation.

Because performance of vehicular systems is improving, and many sensors are mounted on the vehicular systems, the number of communication devices increases and the number of reference devices also increases. Vehicular systems are requested to operate normally even under severe environments such as high or low temperature and strong vibration, and the above-described problem become more remarkable.

For example, the use of a crystal oscillator for the reference device increases a mounting area for the circuit and the power consumption. This makes it difficult to provide a small, lightweight, and simple system.

The technology described in JP-A-2005-303632 uses the following system configuration to reduce crystal oscillators and ceramic oscillators. A master reads the main clock frequency from a slave to generate an adjustment signal that adjusts the main clock frequency of the slave to be equal to a main clock frequency of the master. The master generates transmission data based on the adjustment signal.

The slave detects an SMC adjustment signal using the transmission data from the master and adjusts the main clock frequency of the salve to be equal to the main clock frequency of the master based on the SMC adjustment signal. The master and the slave transmit and receive data to set the main clock frequencies and communication carrier frequencies. However, because the above-described method processes the main clock frequencies and the communication carrier frequencies for the master and the slave, a complicated feedback process is required. If the master communicates with multiple slaves, communication channel transmission characteristics may change or the communication may be disabled depending on the number of slaves or routing. The above-described feedback process is unavailable in these states.

SUMMARY

It is an object of the present disclosure to provide a vehicular power line communication system and a slave apparatus capable of minimizing the use of reference devices using crystal oscillators, possibly ensuring the communication performance, enabling a small, lightweight, and simple system, and setting frequencies needed for master-slave communication with minimizing the need for complicated feedback.

A vehicular power line communication system according to an aspect of the present disclosure includes a master apparatus and a slave apparatus communicating with the master apparatus. The master apparatus includes a reference device, a power feeding signal generation portion, a first communication carrier generation portion, a communication signal generation portion, and a superimposition portion. The reference device generates a reference signal having a reference frequency. The power feeding signal generation portion divides or multiples a frequency of the reference signal from the reference device to generate a power feeding signal. The dividing or multiplying includes dividing or multiplying by one. The first communication carrier generation portion divides or multiplies the frequency of the reference signal from the reference device to generate a first communication carrier within a frequency band that is different from a frequency band for the power feeding signal. The communication signal generation portion generates a communication signal having a data communication frequency band using the first communication carrier. The superimposition portion superimposes the communication signal from the communication signal generation portion on the power feeding signal from the power feeding signal generation portion to generate a superimposition signal and transmits the superimposition signal to the slave apparatus.

The slave apparatus includes a separation portion, a second communication carrier generation portion, and a modulation and demodulation portion. The separation portion separates the superimposition signal from the superimposition portion into a power feeding signal having a frequency band for the power feeding signal generation portion and a communication signal having the data communication frequency band. The second communication carrier generation portion divides or multiplies a frequency of the power feeding signal separated by the separation portion to generate a second communication carrier. The modulation and demodulation portion modulates and demodulates a data communication signal to be communicated with the master apparatus using the second communication carrier.

The master apparatus generates the first communication carrier for data modulation and demodulation by dividing or multiplying the frequency of the reference signal from the reference device. The slave apparatus generates the second communication carrier for data modulation and demodulation by dividing or multiplying the frequency of the power feeding signal. The frequency of the first communication carrier for the master apparatus relates to the frequency of the second communication carrier for the slave apparatus according to the reference frequency from the reference device. In a vehicle, the reference frequency from the reference device varies with the circumference environment for the master apparatus, and the influence is simultaneously applied to the first communication carrier and the second communication carrier.

Thus, even if the system is exposed to a severe environment, the first communication carrier frequency and the second communication carrier frequency are similarly influenced. Therefore, the master apparatus and the slave apparatus can normally communicate with each other. Since the reference device is provided only for the master apparatus, the slave apparatus requires no reference device.

Thus, circuit mounting areas can be reduced and the power consumption can be saved even if many sensors are mounted on a vehicle to increase the number of communication devices. In addition, the communication device can be smaller, lighter, and simpler. Communication carriers can be set without the need for the slave apparatus to feed information back to the master apparatus.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
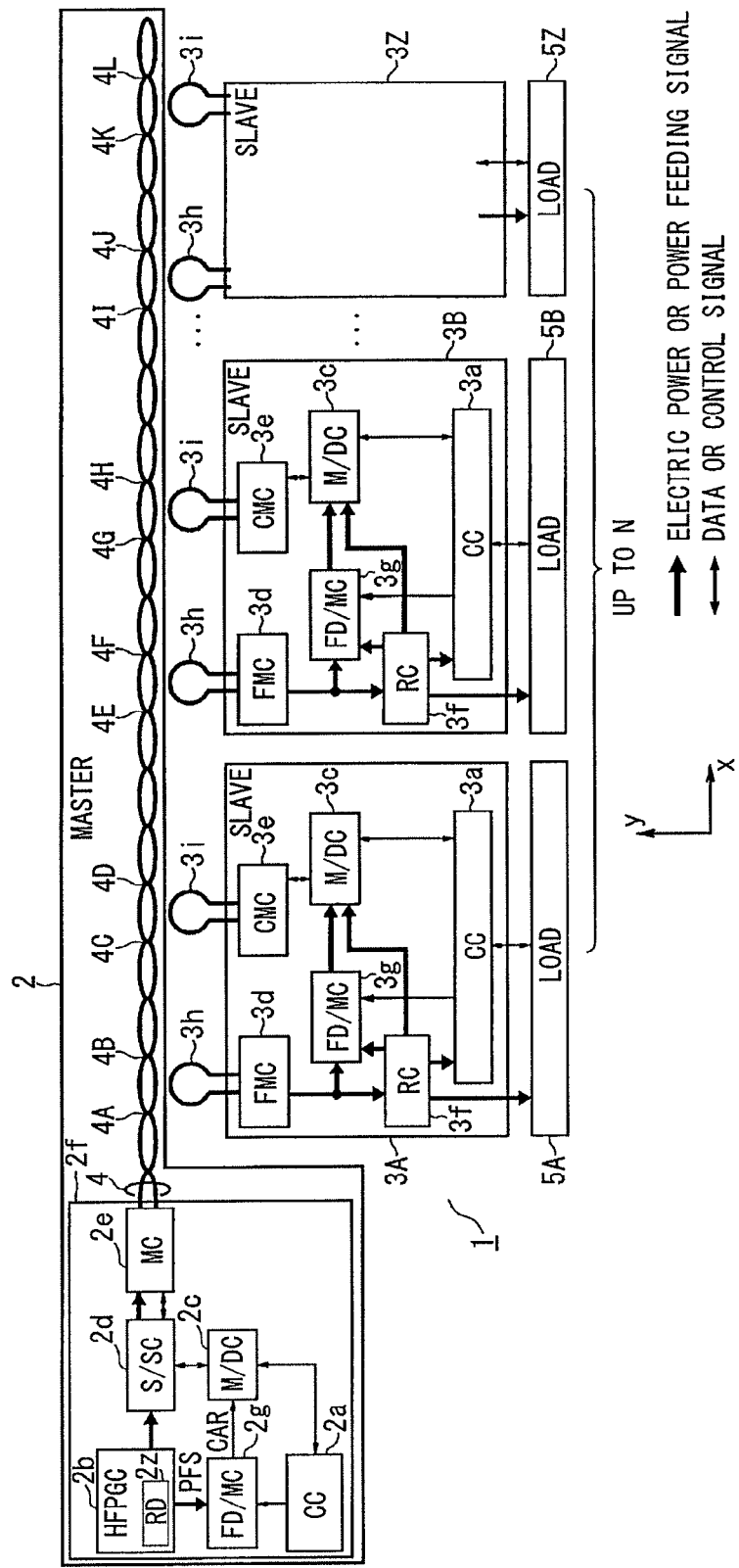
FIG. 1 is a diagram illustrating a vehicular power line communication system according to a first embodiment.
Figure 2:
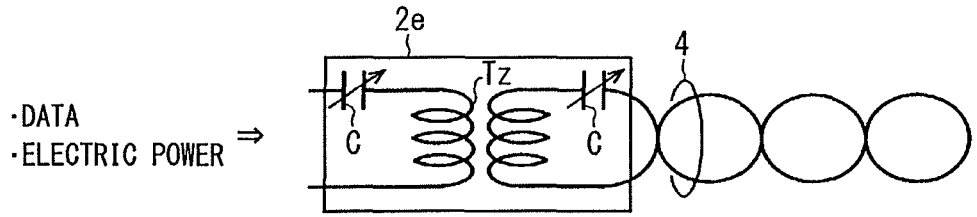
FIG. 2 is a diagram illustrating a first example of a matching circuit in a master.
Figure 3:
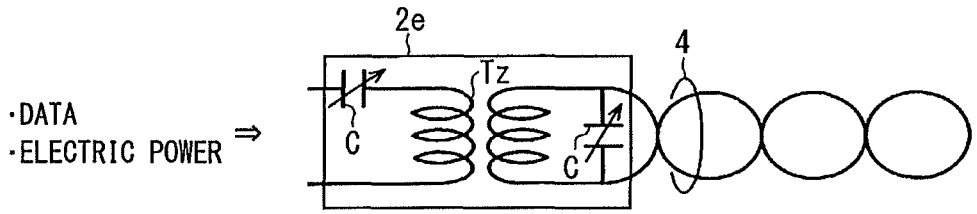
FIG. 3 is a diagram illustrating a second example of a matching circuit in the master.

Embodiments of the present disclosure will be described. The same or similar parts or components in the embodiments are designated by the same or similar reference numerals. The description of the same or similar parts or components is omitted as needed, and characterizing parts of each embodiment will be mainly described.

A data communication mode described in each embodiment concerns data communication between a master apparatus and a slave device. If the master-slave connection is wired, the data communication is applied to communication between same or different electronic control units (ECUs) mounted on vehicles, for example. If the master-slave connection is wireless, the data communication is applied to communication between different ECUs. The data communication is also available for communication between the ECU (master) and multiple sensors (slaves).

First Embodiment

A first embodiment will be described with reference to FIGS. 1 through 16. The first embodiment provides wireless connection between a master apparatus and a slave apparatus. A vehicular power line communication system 1 illustrated in FIG. 1 includes a master apparatus 2 and slave apparatuses 3A through 3Z. The master apparatus 2 is connected with a battery (not shown).

The master apparatus 2 supplies power to the slave apparatuses 3A through 3Z via a power line in accordance with the power supplied from the battery (not shown). The slave apparatuses 3A through 3Z operate according to the supplied power. The slave apparatuses 3A through 3Z are connected with loads 5A through 5Z including sensors and actuators.

The master apparatus 2 includes a master body $2f$ that includes a control circuit (CC) $2a$, a high-frequency power generator circuit (HFPGC) $2b$, a modulation/demodulation circuit (M/DC) $2c$, a superimposition/separation circuit (S/SC) $2d$, a matching circuit (MC) $2e$, and a frequency division/multiplication circuit (FD/MC) $2g$. The control circuit $2a$ controls communication and the other functions. The master body $2f$ is connected with a twisted pair wire 4 used as a transmission antenna. The control circuit $2a$ mainly includes a microcomputer. The high-frequency power generator circuit $2b$ generates a high-frequency signal of a predetermined frequency and outputs the high-frequency signal as a power feeding signal (PFS) to the superimposition/separation circuit $2d$ and the frequency division/multiplication circuit $2g$.

The high-frequency power generator circuit $2b$ includes a reference device (RD) $2z$, that is, a crystal oscillation circuit to output square waves using a crystal oscillator, for example. The high-frequency power generator circuit $2b$ outputs a square wave of predetermined frequency fin (e.g., 13.56 MHz) as a power feeding signal. The high-frequency power generator circuit $2b$ may use a temperature compensated crystal oscillator (TCXO). In this case, the high-frequency power generator circuit $2b$ can output a temperature-compensated, stable power feeding signal.

When the high-frequency power generator circuit $2b$ transmits a power feeding signal to the frequency division/multiplication circuit $2g$, the frequency division/multiplication circuit $2g$ converts the power feeding signal into a square wave signal having a data modulation frequency according to division-ratio/multiplication-ratio data supplied from the control circuit $2a$ and outputs the square wave signal to the modulation/demodulation circuit $2c$. Under control of the control circuit $2a$, the modulation/demodulation circuit $2c$ modulates transmission data from the master apparatus 2 using the output signal from the frequency division/multiplication circuit $2g$ to generate a data modulation signal and outputs the data modulation signal to the superimposition/separation circuit $2d$.

The superimposition/separation circuit $2d$ mixes the power feeding signal and the data modulation signal and outputs these signals to the matching circuit $2e$. The matching circuit $2e$ transmits a carrier signal (CAR) (the power feeding signal and the data modulation signal as a high-frequency signal) superimposed with the data modulation signal to the twisted pair wire 4. The control circuit $2a$ connects a communication line to the modulation/demodulation circuit $2c$ and is capable of controlling modulation and demodulation systems. The control circuit $2a$ transmits or receives data from the modulation/demodulation circuit $2c$.

FIGS. 2 through 5 illustrate examples of the matching circuit $2e$. As illustrated in FIGS. 2 through 5, the matching circuit $2e$ includes transformer Tz and variable-capacitance capacitors C. Variable-capacitance capacitors C are connected in series or parallel at the primary and/or secondary side of transformer Tz. The matching circuit $2e$ may use any circuit form as long as impedance matching is available.

Figure 6:
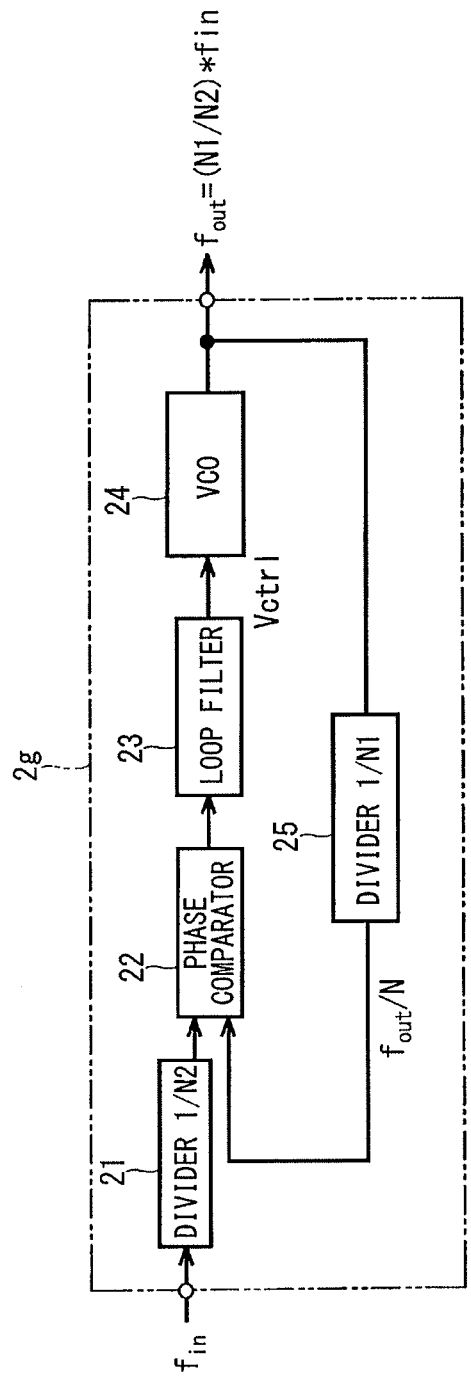
FIG. 6 is a diagram illustrating a first example of a frequency division/multiplication circuit.
Figure 7:
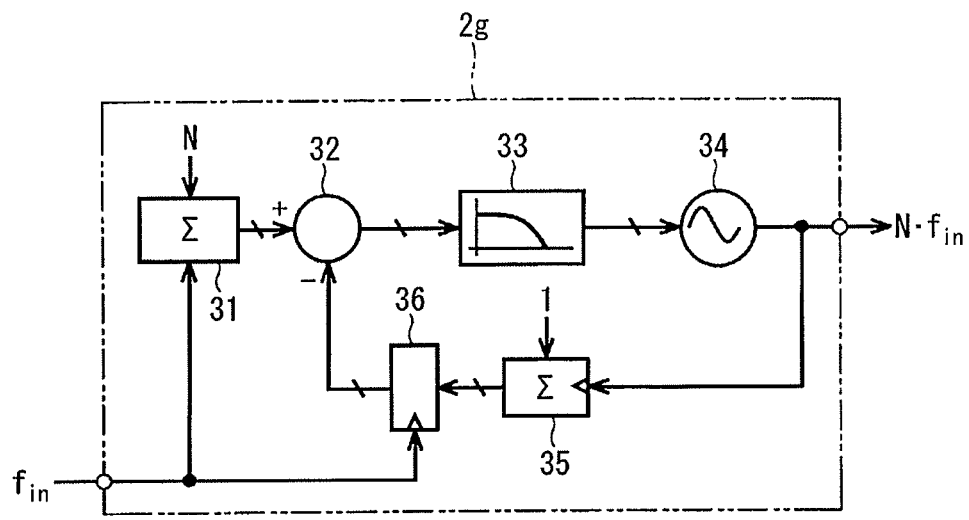
FIG. 7 is a diagram illustrating a second example of a frequency division/multiplication circuit.

FIGS. 6 and 7 illustrate examples of the frequency division/multiplication circuit $2g$. Either of the configurations in FIGS. 6 and 7 may be used. The frequency division/multiplication circuit $2g$ illustrated in FIG. 6 includes a divider 21, a phase comparator 22, a voltage-controlled oscillator (VCO) 24, and a divider 25. The divider 21 divides a frequency of a power feeding signal by N2. The phase comparator 22 is supplied with an output from the divider 21. The voltage-controlled oscillator (VCO) 24 is supplied with an output from the phase comparator 22 via a loop filter 23. The divider 25 divides a frequency of an output from the voltage-controlled oscillator 24 by N1 and supplies the output to the phase comparator 22.

The phase comparator 22 compares phase differences in division signals from the two dividers 21 and 25 and outputs a difference signal to the loop filter 23. The loop filter 23 removes alternating-current components and outputs direct-current control voltage Vctrl to the voltage-controlled oscillator 24. The voltage-controlled oscillator 24 adjusts and outputs an oscillating frequency according to the direct-current control voltage. The frequency division/multiplication circuit $2g$ illustrated in FIG. 6 is configured as an analog PLL circuit as described above. When the frequency of a power feeding signal input to the frequency division/multiplication circuit $2g$ is denoted by fin and a carrier frequency of a signal output from the frequency division/multiplication circuit $2g$ is denoted by fout, the carrier frequency fout can be expressed by the following equation (1).

$$f_{out} = (N1/N2) \times f_{in} \tag{1}$$

The frequency division/multiplication circuit $2g$ illustrated in FIG. 7 includes a phase integrator (phase accumulator) 31, a phase subtractor 32, a digital loop filter 33, a digitally controlled oscillator (DCO) 34, a phase integrator 35, and a shift register 36 having the division function.

The phase integrator 31 counts power feeding signals as square wave pulses and outputs a digital value to the phase subtractor 32. The digital loop filter 33 removes high frequencies from a subtraction result of the phase subtractor 32 to generate a digital value and outputs the digital value to the digitally controlled oscillator 34. The digitally controlled oscillator 34 outputs an analog oscillation signal according to the digital value output from the digital loop filter 33. The digitally controlled oscillator 34 outputs the analog oscillation signal having frequency N·fin.

The phase integrator 35 shapes the waveform of the analog oscillation signal into a rectangular pulse and supplies digital output to the shift register 36. The shift register 36 divides outputs by constant N and supplies the digital output from the phase integrator 35 to the phase subtractor 32 in synchronization with rising or falling time of the power feeding signal. A feedback loop is configured in this manner.

The circuit illustrated in FIG. 7 provides an example of acquiring an output of power feeding signal fin multiplied by N (>1). Alternatively, the frequency division/multiplication circuit $2g$ may generate frequency-divided output by appropriately changing values input to the phase integrators 31 and 35 according to control signals from the control circuit $2a$.

Therefore, the frequency division/multiplication circuit 2g may be configured as a digital PLL circuit.

As illustrated in FIG. 1, the frequency division/multiplication circuit 2g uses the circuit illustrated in FIG. 6 or 7 to generate a square wave signal having the modulation frequency and outputs the square wave signal to the modulation/demodulation circuit 2c. The modulation/demodulation circuit 2c uses the square wave signal to modulate data and outputs modulated data to the superimposition/separation circuit 2d. The superimposition/separation circuit 2d superimposes the modulation signal corresponding to the modulated data on the power feeding signal from the high-frequency power generator circuit 2b and outputs the signal to the twisted pair wire 4 via the matching circuit 2e.

Figure 8:
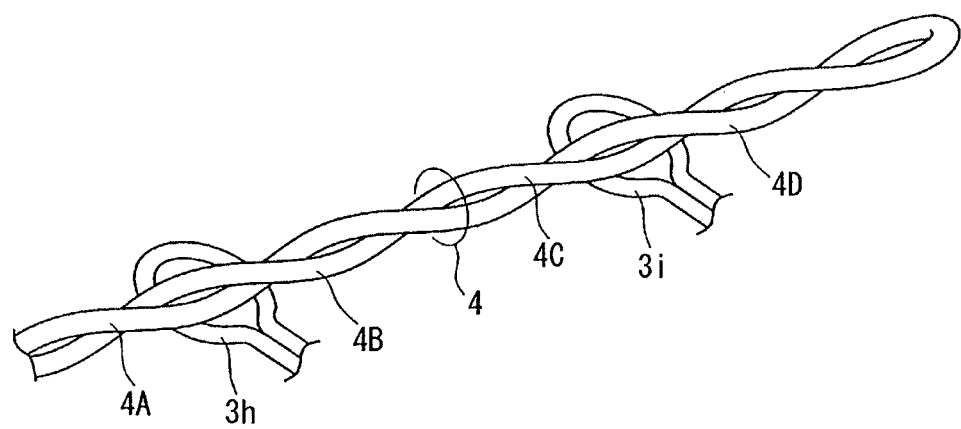
FIG. 8 is a perspective view illustrating a structure of a twisted pair wire whose core is connected at an end to form a loop.

FIG. 8 is a perspective view illustrating the structure of the twisted pair wire 4. The twisted pair wire 4 extends approximately 1 meter as a predetermined length from an output terminal of the master body 2f installed in a vehicle to the farthest position. As illustrated in FIGS. 1 and 8, the twisted pair wire 4 includes a cable core connected at the farthest position (at the end) to form a loop. The specially shaped twisted cable having the connected end is used as a communication line. The description of the present disclosure defines this communication line as the twisted pair wire 4.

The twisted pair wire 4 extends from the master body 2f of the master apparatus 2 to the vicinity of the slave apparatuses 3A through 3Z. For example, the twisted pair wire 4 uses an unshielded twisted pair (UTP) cable. The twisted pair wire 4 includes many twists 4A, 4B, and so on. An aperture region between the twists 4A and 4B is placed opposite to an aperture antenna 3h of the slave apparatus 3A. An aperture region between the twists 4C and 4D is placed opposite to an aperture antenna 3i of the slave apparatus 3A.

As illustrated in FIG. 1, each aperture antenna 3h of the slave apparatuses 3B through 3Z is similarly placed opposite to each aperture region between the twists 4E and 4F through between the twists 4I and 4J. Each aperture antenna 3i of the slave apparatuses 3B through 3Z is similarly placed opposite to each aperture region between the twists 4G and 4H through between the twists 4K and 4L.

FIG. 1 particularly illustrates placement positions of the twists 4A through 4L of the twisted pair wire 4. Aperture regions between twists 4A and 4B, 4E and 4F, . . . , 4I and 4J of the twisted pair wire 4 are illustrated so as to correspond to the aperture regions of the aperture antenna 3h only in the X-direction. However, actually, the aperture regions face to each other also in the Y-direction (see FIG. 8) so that the aperture regions overlap with each other.

The twisted pair wire 4 generates electromagnetic fields at the aperture regions between twists 4A and 4B through between 4K and 4L. The electromagnetic fields are subject to strong electromagnetic induction coupling with the aperture antennas 3h and 3i of the slave apparatuses 3A through 3Z. The aperture antennas 3h and 3i of the slave apparatuses 3A through 3Z can contactlessly and strongly receive the power and data modulation signals using electromagnetic fields generated at the aperture regions between the twists 4A and 4B, 4C and 4D, . . . , 4K and 4L of the twisted pair wire 4.

As illustrated in FIG. 1, each of the slave apparatuses 3A through 3Z includes a control circuit (CC) 3a, a modulation/demodulation circuit (M/DC) 3c, a feeding matching circuit (FMC) 3d, a communication matching circuit (CMC) 3e, a rectifying circuit (RC) 3f, and a frequency division/multiplication circuit (FD/MC) 3g. The feeding matching circuit 3d is connected with the aperture antenna 3h for power reception. The communication matching circuit 3e is connected with the aperture antenna 3i for data reception. The aperture antennas 3h and 3i are shaped into a loop and use the electromagnetic induction coupling to receive electromagnetic fields generated from the twisted pair wire 4.

Figure 9:
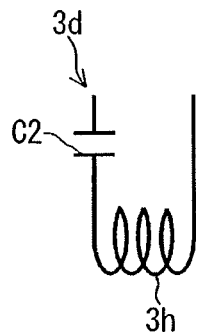
FIG. 9 is a diagram illustrating a first example of a feeding matching circuit in a slave.
Figure 10:
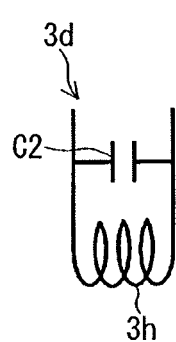
FIG. 10 is a diagram illustrating a second example of a feeding matching circuit in the slave.

FIGS. 9 and 10 illustrate examples of equivalent circuits for the feeding matching circuit 3d at the receiving side. The feeding matching circuit 3d includes the aperture antenna 3h connected with a fixed capacitance capacitor C2 in parallel or series. The feeding matching circuit 3d matches a transmission frequency band (e.g., 13.56 MHz band) for high-frequency power signals.

Figure 11:
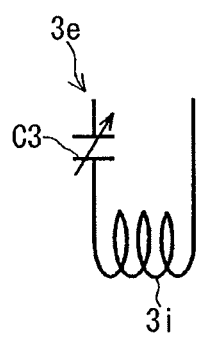
FIG. 11 is a diagram illustrating a first example of a communication matching circuit in the slave.
Figure 12:
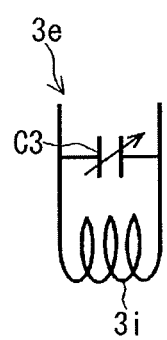
FIG. 12 is a diagram illustrating a second example of a communication matching circuit in the slave.

FIGS. 11 and 12 illustrate examples of equivalent circuits for the communication matching circuit 3e at the receiving side. The communication matching circuit 3e includes the aperture antenna 3i connected with a variable-capacitance capacitor C3 in parallel or series. The communication matching circuit 3e varies capacitance values of the variable-capacitance capacitor C3 according to control of the control circuit 3a and enables impedance matching with a predetermined frequency band (several tens of megahertz) higher than the above-described power supply frequency band.

Figure 13:
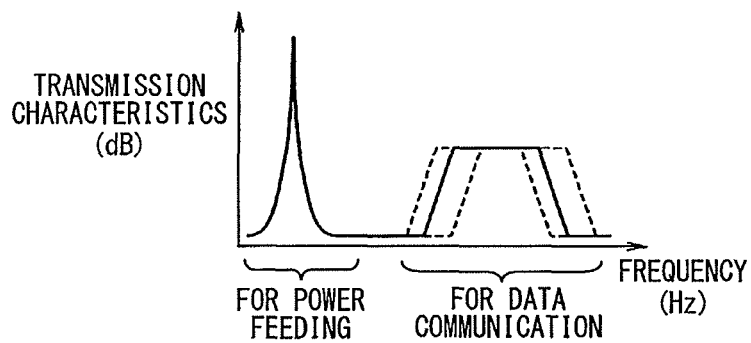
FIG. 13 is a diagram illustrating frequency transmission characteristics of the master.
Figure 14:
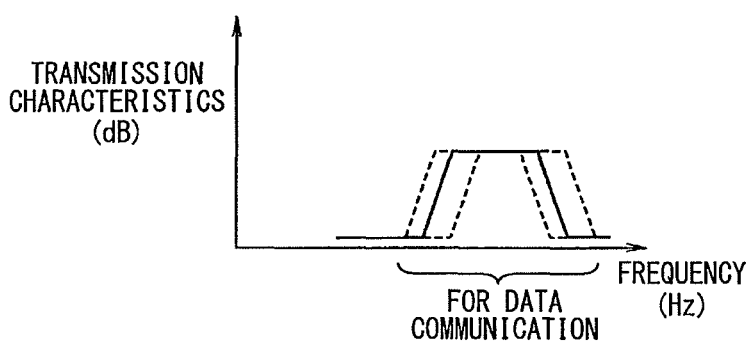
FIG. 14 is a diagram illustrating frequency transmission characteristics of the communication matching circuit in the slave.
Figure 15:
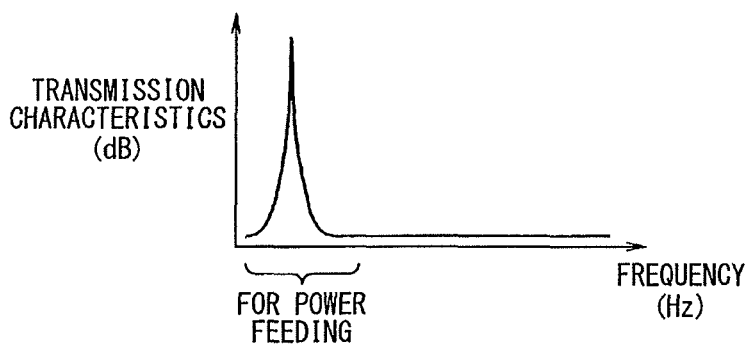
FIG. 15 is a diagram illustrating frequency transmission characteristics of the feeding matching circuit in the slave.

FIG. 13 illustrates transmission characteristics of the matching circuit 2e at the master apparatus 2. FIGS. 14 and 15 illustrate transmission characteristics of the communication matching circuit 3e and the feeding matching circuit 3d, respectively, at the slave apparatuses 3A through 3Z. As illustrated in FIGS. 13 through 15, frequency bands are divided into a frequency band for power feeding (e.g., 13.56 MHz band) and a frequency band for data communication (several tens of megahertz). Accordingly, the matching circuit 2e, the feeding matching circuit 3d, and the communication matching circuit 3e having more appropriate bandwidths and transmission characteristics.

The data communication frequency band is set to be higher than the power supply frequency band (13.56 MHz band) because the data communication speed is relatively high. If the data communication speed is low, however, the data communication frequency band may be set to be lower than the power supply frequency band. Therefore, the slave apparatuses 3A through 3Z can use the aperture antennas 3h and 3i to respectively receive power feeding signals and data modulation signals transmitted from the master body 2f of the master apparatus 2.

Figure 16:
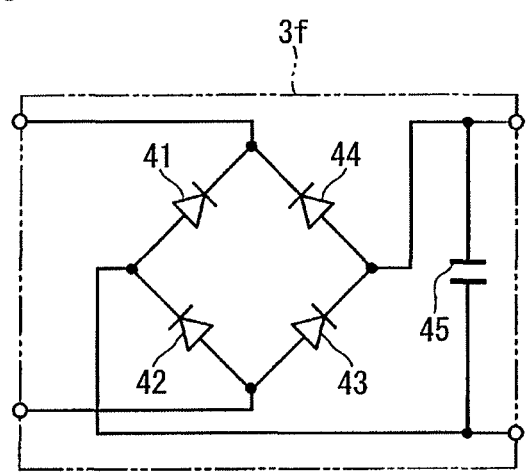
FIG. 16 is a diagram illustrating a rectifying circuit.

As shown in FIG. 1, when the feeding matching circuit 3d receives a power feeding signal for electric power, the feeding matching circuit 3d outputs the power feeding signal to the rectifying circuit 3f. FIG. 16 illustrates an example of an equivalent circuit for the rectifying circuit 3f at the receiving side. The rectifying circuit 3f includes a full-wave rectifying circuit formed by combining diodes 41 through 44 in the full-wave rectification bridge configuration and a smoothing capacitor 45 connected in parallel with output from the full-wave rectifying circuit The rectifying circuit 3f rectifies and smoothes the power feeding signal to generate DC power and supplies the DC power to the modulation/demodulation circuit 3c, the frequency division/multiplication circuit 3g, the control circuit 3a, and the load 5A.

The modulation/demodulation circuit 3c operates on the DC power supplied from the rectifying circuit 3f. The modulation/demodulation circuit 3c receives a data modulation signal through the aperture antenna 3i that is matched by the communication matching circuit 3e with a predetermined frequency band for data communication.

The frequency division/multiplication circuit 3g operates on the DC power supplied from the rectifying circuit 3f. The frequency division/multiplication circuit 3g for the slave apparatuses 3A through 3Z is configured similarly to the frequency division/multiplication circuit 2g for the master apparatus 2. The control circuit 3a can control a division or multiplication ratio for the frequency division/multiplication circuit 3g. The frequency division/multiplication circuit 3g receives a control signal (i.e., a division or multiplication ratio for the frequency division/multiplication circuit 3g) for communication carrier frequencies from the control circuit 3a. According to the control signal, the frequency division/multiplication circuit 3g divides or multiplies a frequency of a power feeding signal output from the feeding matching circuit 3d. The frequency division/multiplication circuit 3g converts the signal into a predetermined communication carrier frequency and outputs it to the modulation/demodulation circuit 3c.

The modulation/demodulation circuit 3c operates on DC power supplied from the rectifying circuit 3f. The modulation/demodulation circuit 3c uses an output signal from the frequency division/multiplication circuit 3g as a communication carrier for data demodulation (corresponding to a second communication carrier). The modulation/demodulation circuit 3c demodulates a data modulation signal output from the communication matching circuit 3e and outputs the demodulated data to the control circuit 3a.

The control circuit 3a operates on DC power supplied from the rectifying circuit 3f and receives data demodulated by the modulation/demodulation circuit 3c. The control circuit 3a controls the load 5A based on the demodulated data. The slave apparatuses 3A through 3Z similarly perform these operations. In this manner, the master apparatus 2 can transmit communication data to the slave apparatuses 3A through 3Z.

The following describes operations of the slave apparatuses 3A through 3Z to transmit data to the master apparatus 2. The control circuit 3a for the slave apparatuses 3A through 3Z transmits data to the modulation/demodulation circuit 3c. The modulation/demodulation circuit 3c uses an output signal from the frequency division/multiplication circuit 3g as a communication carrier for data modulation to modulate data transmitted from the control circuit 3a. The modulation/demodulation circuit 3c outputs a data modulation signal to the aperture antenna 3i via the communication matching circuit 3e. The aperture antenna 3i outputs the data modulation signal as an electromagnetic wave.

When the master apparatus 2 receives the data modulation signal via the matching circuit 2e, the superimposition/separation circuit 2d filters the data modulation signal and outputs the filtered data modulation signal to the modulation/demodulation circuit 2c. The modulation/demodulation circuit 2c demodulates the data using a signal divided or multiplied by the frequency division/multiplication circuit 2g as a communication carrier for data demodulation and outputs the data to the control circuit 2a. In this manner, the slave apparatuses 3A through 3Z can transmit communication data to the master apparatus 2.

In the master apparatus 2 according to the present embodiment, the frequency division/multiplication circuit 2g divides or multiplies the frequency of the power feeding signal from the high-frequency power generator circuit 2b. The modulation/demodulation circuit 2c uses this signal as a communication carrier for data modulation to modulate data and transmits modulated data to the slave apparatus 3A. In the slave apparatuses 3A through 3Z, the frequency division/multiplication circuit 3g divides or multiplies the frequency of the power feeding signal acquired via the feeding matching circuit 3d to generate a communication carrier. The modulation/demodulation circuit 3c uses this communication carrier to demodulate data. The slave apparatuses 3A through 3Z can omit the oscillation circuit or the TCXO using a crystal oscillator. As a result, the slave apparatus 3A can be miniaturized to reduce the weight. Constituent circuits can be simplified. Further, the slave apparatuses 3A through 3Z can operate hardly under the influence of external temperature changes or vibrations. It should be noted that, in the present disclosure, the word "division or multiplication" includes integral multiple, decimal multiple, and multiple by one.

The frequency of a power feeding signal output from the high-frequency power generator circuit 2b may be set to be lower than the frequency of the communication carrier output from the frequency division/multiplication circuit 2g or 3g. In such a case, the power feeding signal exchanged between the master apparatus 2 and the slave apparatus 3A through 3Z hardly attenuates and is hardly affected by frequency characteristics of transmission lines (propagation paths).

In many cases, the amplitude level of the power feeding signal is set to be larger than the amplitude level of the data modulation signal in consideration of the power supply efficiency. In the slave apparatuses 3A through 3Z according to the present embodiment, the frequency division/multiplication circuit 3g divides or multiplies the frequency of the power feeding signal supplied from the master apparatus 2 and outputs the divided or multiplied signal as a communication carrier. The amplitude level can be increased to recover the communication carrier.

The transmission level may excessively decrease if a ripple occurs in frequency characteristics of transmission between the master apparatus 2 and the slave apparatuses 3A through 3Z. In such a case, the technology described in patent document 1 cannot correct the main clock frequency or the communication carrier frequency.

The vehicular power line communication system 1 according to the present embodiment is configured so that the frequency of the power feeding signal differs from the data communication frequency band. The slave apparatuses 3A through 3Z multiply the frequency of the power feeding signal to recover the communication carrier. The communication carrier can be recovered to enable satisfactory communication between the master apparatus 2 and the slave apparatuses 3A through 3Z while the transmission level is maintained as high as possible.

Second Embodiment

Figure 17:
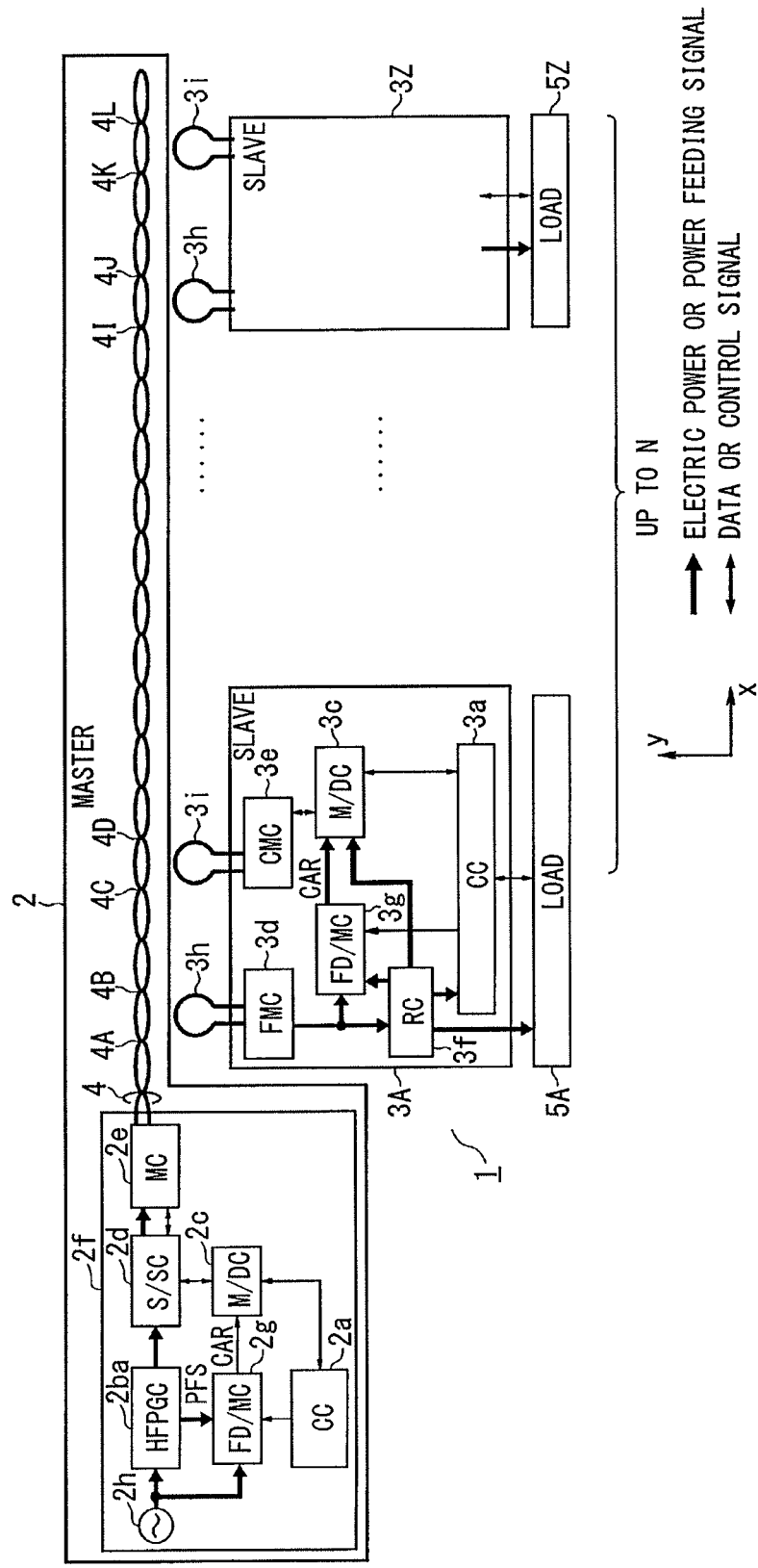
FIG. 17 is a diagram illustrating a vehicular power line communication system according to a second embodiment.

FIG. 17 illustrates a second embodiment. The second embodiment differs from the first embodiment in that the master apparatus 2 replaces the high-frequency power generator circuit 2b with a high-frequency power generator circuit (HFPGC) 2ba and an oscillation source 2h. As illustrated in FIG. 17, the oscillation source 2h provides a circuit that generates a reference frequency. The oscillation source 2h is configured as a reference device using a crystal oscillation circuit. The oscillation source 2h outputs a signal having the reference frequency to the high-frequency power generator circuit 2ba. Based on the reference-frequency signal, the high-frequency power generator circuit 2ba generates a power feeding signal (PFS). For example, the power feeding signal is a square wave signal of 13.56 MHz. As exemplified in this embodiment, the high-frequency power generator circuit 2ba and the oscillation source 2h may be configured separately.

Third Embodiment

Figure 18:
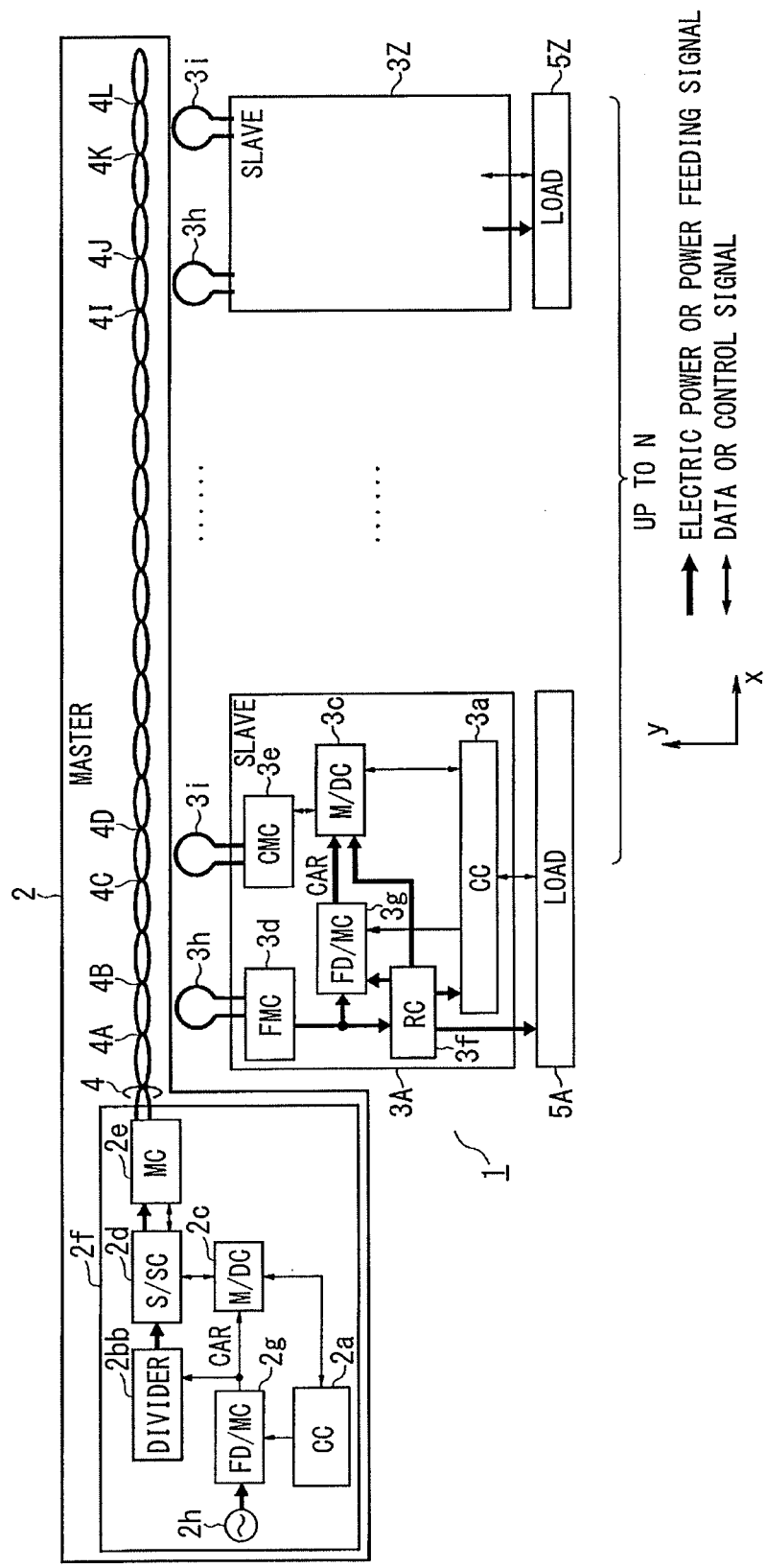
FIG. 18 is a diagram illustrating a vehicular power line communication system according to a third embodiment.
Figure 19:
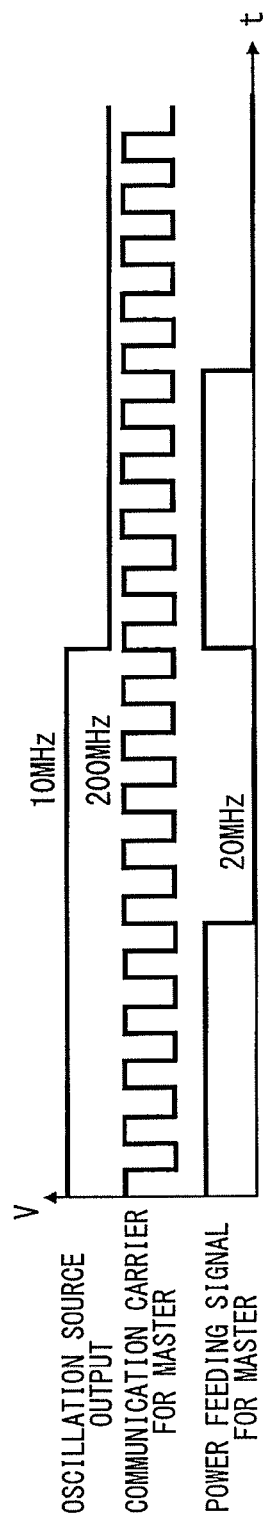
FIG. 19 is a diagram illustrating operation frequencies of components in the third embodiment.

FIGS. 18 and 19 illustrate a third embodiment. As illustrated in FIG. 18, the oscillation source 2h generates a reference-frequency signal and outputs the reference-frequency signal to the frequency division/multiplication circuit 2g. The frequency division/multiplication circuit 2g uses the PLL circuit (see FIG. 6 or 7) to divide or multiply the frequency of the reference-frequency signal from the oscillation source 2h according to a frequency control signal (division-ratio/multiplication-ratio data) from the control circuit 2a. The frequency division/multiplication circuit 2g converts the reference-frequency signal into a communication carrier for data modulation and demodulation and outputs the communication carrier to the modulation/demodulation circuit 2c and a divider 2bb.

The divider 2bb divides a frequency of the input communication carrier by a predetermined value and outputs the divided communication carrier as a power feeding signal (PFS) to the superimposition/separation circuit 2d. The modulation/demodulation circuit 2c is supplied with a communication carrier for data modulation and demodulation from the frequency division/multiplication circuit 2g, modulates data transmitted from the control circuit 2a, and outputs a data modulation signal to the superimposition/separation circuit 2d. The superimposition/separation circuit 2d superimposes the data modulation signal from the modulation/demodulation circuit 2c on the power feeding signal output from the divider 2bb and outputs the superimposed signal to the matching circuit 2e. The slave apparatuses 3A through 3Z are supplied with the superimposed signal of the power feeding signal and the data modulation signal. The slave apparatuses 3A through 3Z operate similarly to the above-described embodiments and a description will be omitted for simplicity.

FIG. 19 illustrates an example of frequency setting. When the oscillation source 2h outputs a 10-MHz square wave signal, for example, the frequency division/multiplication circuit 2g multiplies a frequency of the square wave signal by 20 to convert the signal into a communication carrier as a 200-MHz square wave, for example. The divider 2bb divides the frequency of the square-wave communication carrier by 10 to generate a 20-MHz power feeding signal, for example. Similarly to the above-described embodiments, the third embodiment can also apply different frequency bands to the power feeding signal and the communication carrier for data modulation and demodulation and is capable of providing a working effect almost similar to the above-described embodiments.

When the slave apparatuses 3A through 3Z transmit a data modulation signal to the master apparatus 2, the superimposition/separation circuit 2d filters the data modulation signal and outputs the filtered date modulation signal to the modulation/demodulation circuit 2c. On the other hand, the modulation/demodulation circuit 2c is supplied with a communication carrier for data modulation and demodulation from the frequency division/multiplication circuit 2g, demodulates the data modulation signal using the communication carrier, and outputs the data to control circuit 2a. The third embodiment is capable of providing a working effect almost similar to the above-described embodiments.

In the above-described example, the divider 2bb uses the division ratio set to the predetermined value. However, the division ratio may be set according to the frequency control signal (division ratio data) from the control circuit 2a. In this case, a control line (not shown) connects the control circuit 2a with the divider 2bb.

There may be a case of reversing the magnitude relationship between the power feeding signal frequency and the communication carrier frequency for data modulation and demodulation. In other words, the power feeding signal frequency and the communication carrier frequency for data modulation and demodulation may be lower than the power feeding signal frequency. In this case, the divider 2bb may be replaced by a multiplier.

Fourth Embodiment

Figure 20:
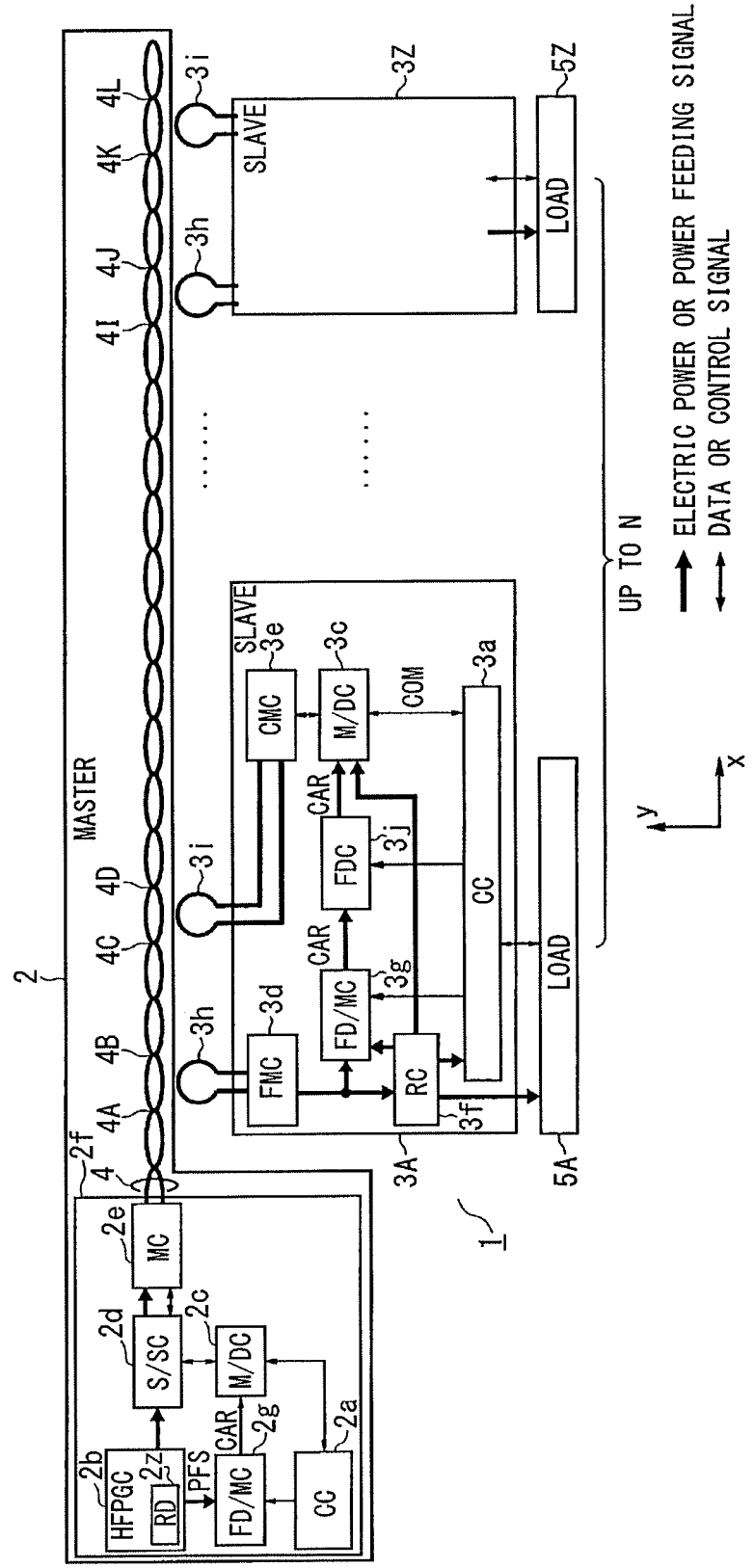
FIG. 20 is a diagram illustrating a vehicular power line communication system according to a fourth embodiment.
Figure 21:
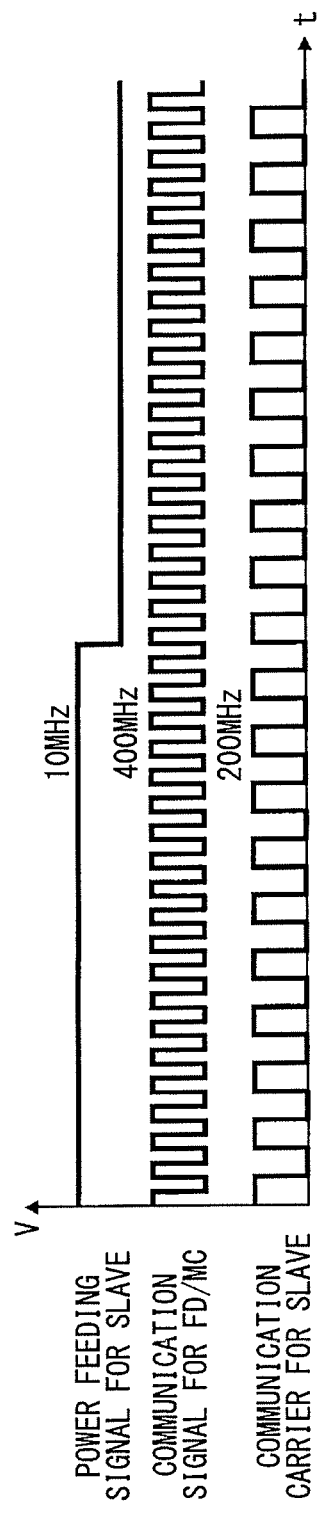
FIG. 21 is a diagram illustrating operation frequencies of components in the fourth embodiment.

FIGS. 20 and 21 illustrate a fourth embodiment. As illustrated in FIG. 20, the master apparatus 2 according to the present embodiment is configured similarly to the first embodiment. The master apparatus 2 operates similarly to the first embodiment. The present embodiment is characterized by operations of the slave apparatuses 3A through 3Z.

The slave apparatuses 3A through 3Z are supplied with a power feeding signal via the feeding matching circuit 3d. The power feeding signal is input to the frequency division/multiplication circuit 3g. The frequency division/multiplication circuit 3g acquires the power feeding signal from the feeding matching circuit 3d and divides or multiplies the power feeding signal according to a frequency control signal (division-ratio/multiplication-ratio data) from the control circuit 3a.

In the present embodiment, each of the slave apparatuses 3A through 3Z includes a frequency division circuit (FDC) 3j subsequent to the frequency division/multiplication circuit 3g. The frequency division circuit 3J uses a digital circuit, for example. The frequency division circuit 3j divides a frequency of an output signal from the frequency division/multiplication circuit 3g according to a frequency control signal (division-ratio data) from the control circuit 3a. The frequency division circuit 3j outputs the division signal as a communication carrier for data modulation and demodulation to the modulation/demodulation circuit 3c. In other words, the control circuit 3a sets the division-ratio/multiplication-ratio of the frequency division/multiplication circuit 3g and sets the division ratio of the frequency division circuit 3j to set the frequency of a communication carrier for data modulation and demodulation. The control circuit 3a also communicates (COM) with the modulation demodulation circuit 3c.

Figure 4:
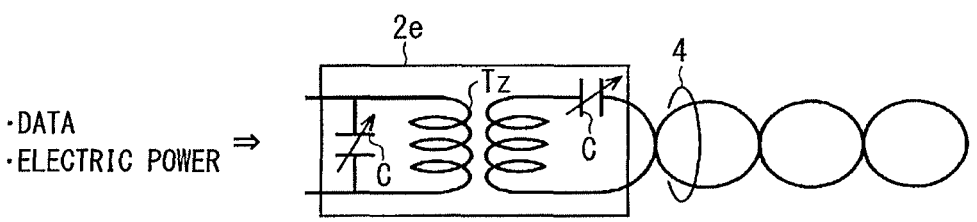
FIG. 4 is a diagram illustrating a third example of a matching circuit in the master.
Figure 5:
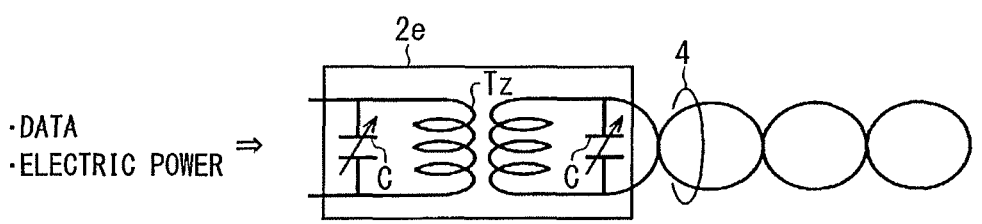
FIG. 5 is a diagram illustrating a fourth example of a matching circuit in the master.

FIG. 21 illustrate an example of frequency setting. As shown in FIG. 4, when the feeding matching circuit 3d of the slave apparatus 3A supplies a power feeding signal as a 10-MHz square wave signal, the frequency division/multiplication circuit 3g multiplies the frequency of the square wave signal by 40 to convert the signal into a 400-MHz square wave, for example. The frequency division circuit 3 halves the frequency of the square wave signal to generate a 200-MHz communication carrier, for example, and outputs the communication carrier to the modulation/demodulation circuit 3c. The fourth embodiment also provides a working effect almost similar to the above-described embodiments.

Fifth Embodiment

Figure 22:
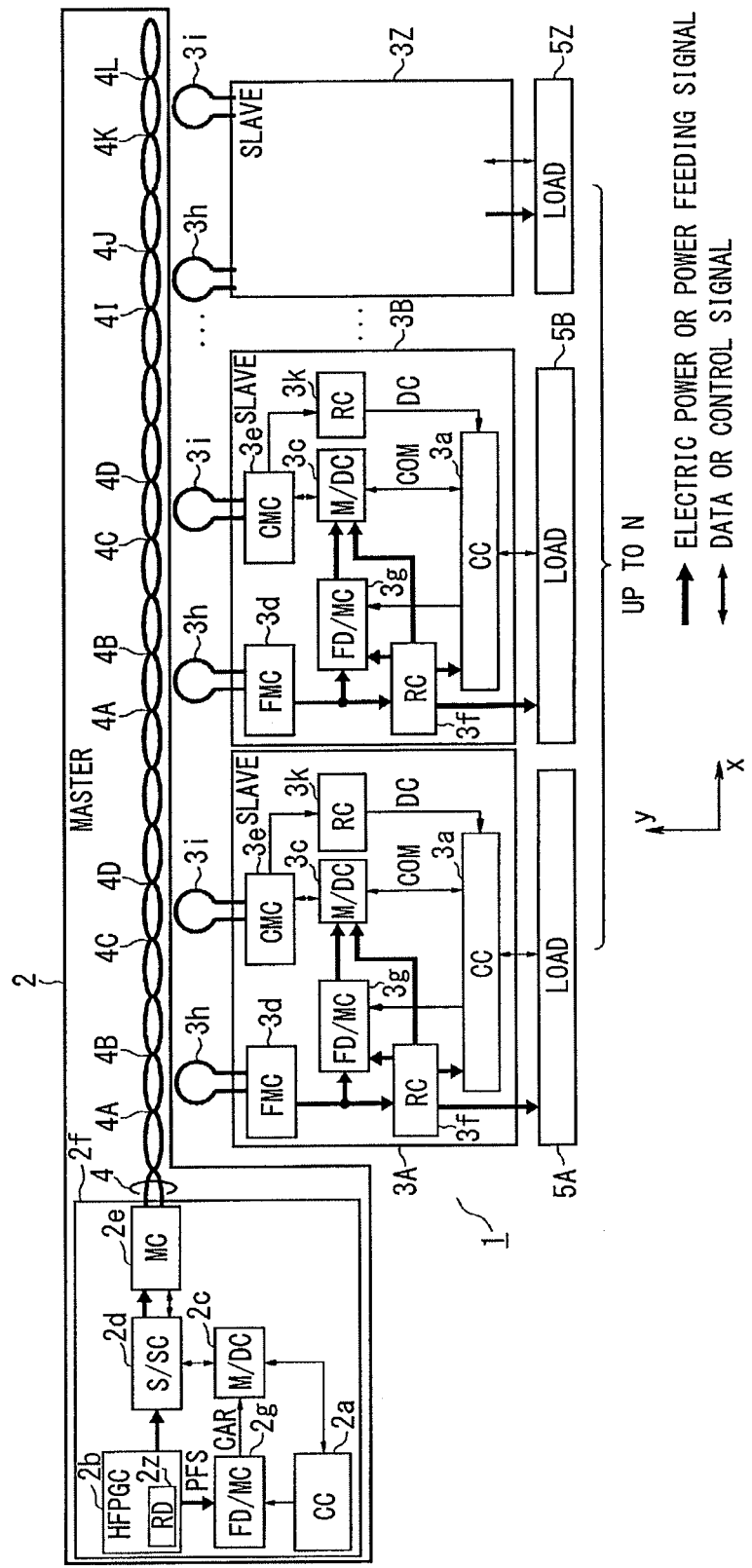
FIG. 22 is a diagram illustrating a vehicular power line communication system according to a fifth embodiment.

FIG. 22 illustrates a fifth embodiment. As illustrated in FIG. 22, the fifth embodiment is configured similarly to the first embodiment. The fifth embodiment is characterized by operations of the slave apparatuses 3A through 3Z. Each of the slave apparatuses 3A through 3Z includes a rectifying circuit (RC) 3k. According to the fifth embodiment, the vehicular power line communication system 1 uses the rectifying circuit 3k to estimate transmission path characteristics H based on a single tone (corresponding to a single-frequency communication signal).

Similarly to the rectifying circuit 3f (see FIG. 16), the rectifying circuit 3k includes a full-wave rectifying circuit or a half-wave rectifying circuit. The rectifying circuit 3k is supplied with a data modulation signal from the twisted pair wire 4 via the aperture antenna 3i, rectifies and smoothes the data modulation signal, and outputs the rectified and smoothed data modulation signal to the control circuit 3a. If using a full-wave rectifying circuit, the rectifying circuit 3k can rectify the power regardless of a positive or negative phase and can stably supply the power to the circuit components.

The master apparatus 2 and the slave apparatuses 3A through 3Z change the division-ratio/multiplication-ratio for the frequency division/multiplication circuits 2g and 3g to sweep channels for the modulation/demodulation circuits 2c and 3c during data modulation and demodulation. The master apparatus 2 may transmit signals to the slave apparatuses 3A through 3Z using a single frequency without modulation. In such a case, sweeping frequencies at steps finer than a predetermined value is desirable to accurately estimate transmission path characteristics.

The rectifying circuit 3k for the slave apparatuses 3A through 3Z rectifies the data modulation signal transmitted from the master apparatus 2 and outputs the rectified data modulation signal to the control circuit 3a. The control circuit 3a references DC components rectified and smoothed by the rectifying circuit 3k to detect a division-ratio/multiplication-ratio that caused a notch during data reception at each channel. The control circuit 3a transmits the division-ratio/multiplication-ratio as data to the master apparatus 2.

Figure 23:
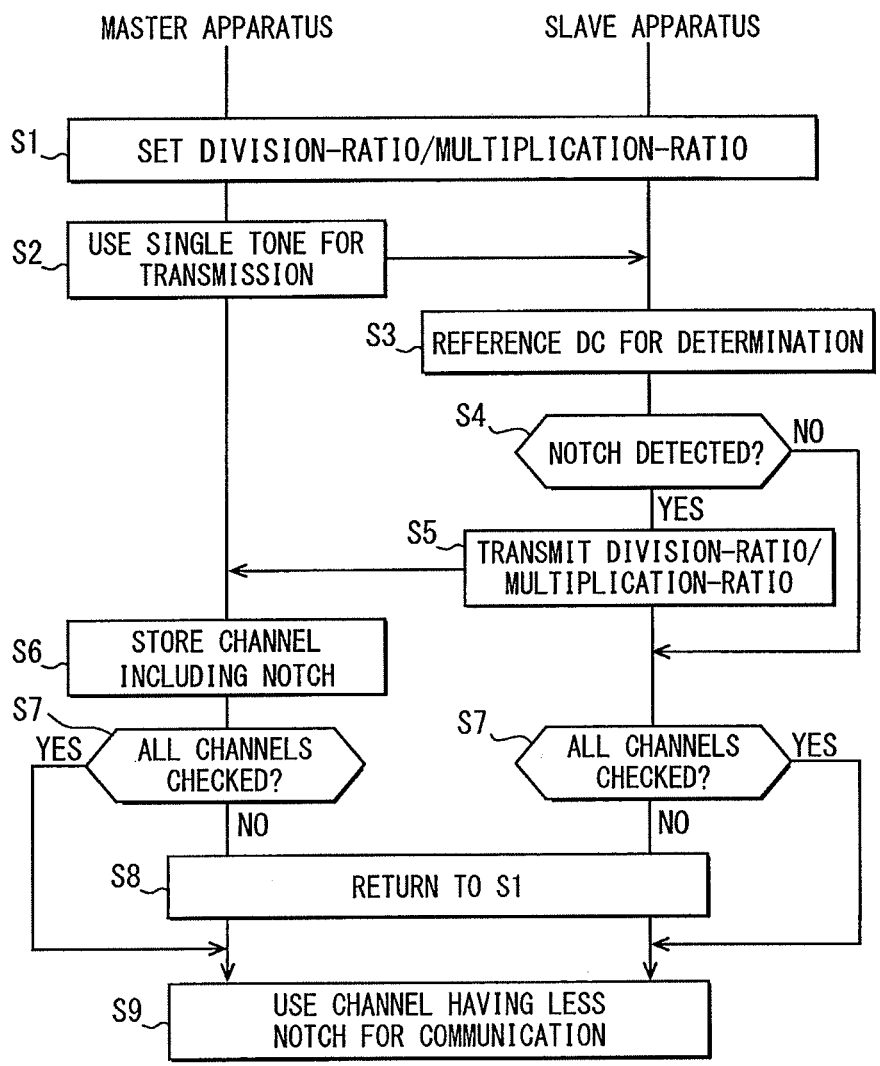
FIG. 23 is a flowchart illustrating operations between a master apparatus and a slave apparatus according to the fifth embodiment.

FIG. 23 is a flowchart illustrating operations between the master apparatus 2 and each of the slave apparatus 3A through 3Z. For example, the division-ratio/multiplication-ratio for the frequency division/multiplication circuit 2g and the division-ratio/multiplication-ratio for the frequency division/multiplication circuit 3g are initially set to predetermined value N0. The master apparatus 2 and the slave apparatus 3A allow a storage portion (not shown) to store channels ch capable of mutual communication. The division-ratio/multiplication-ratio values are successively changed in the range from N0 to N10, for example, to successively change channels ch for data modulation and demodulation (S1).

The master apparatus 2 uses a single tone to transmit the power feeding signal and an output signal from the modulation/demodulation circuit 2c to the slave apparatus 3A without using specified channel ch or modulating data (S2). The modulation/demodulation circuit 2c does not modulate data from the control circuit 2a and outputs only the communication carrier for the frequency division/multiplication circuit 2g to the superimposition/separation circuit 2d. That is, the master apparatus 2 outputs the power feeding signal from the high-frequency power generator circuit 2b and an output signal from the modulation/demodulation circuit 2c to the slave apparatus 3A.

The slave apparatus 3A sweeps channel ch by changing division-ratio/multiplication-ratios N0 through N10 for the frequency division/multiplication circuit 2g. The control circuit 3a references output DC components from the rectifying circuit 3k and determines whether a notch occurs (S3 and S4). If a notch is detected as a result the determination, the slave apparatus 3A transmits data N of the division-ratio/multiplication-ratio to the master apparatus 2 (S5). The control circuit 2a of the master apparatus 2 stores channel ch including the notch (S6). The control circuits check all channels (S7 and S8) and use channel ch without notch for communication process (S9).

If the frequency of the power feeding signal is set to 10 MHz, for example, the present embodiment changes multiplication number N for the frequency division/multiplication circuits 2g and 3g to 15 through 25 and confirms transmission path characteristics H between 150 MHz and 250 MHz. Communication between the master apparatus 2 and the slave apparatus 3A may use channel ch that indicates best transmission path characteristics H. For example, the analogy PLL circuit as illustrated in FIG. 7 may be used for the frequency division/multiplication circuits 2g and 3g. In this case, the channel estimation accuracy may be improved by using a fractional-N PLL circuit rather than an integer-N PLL circuit.

According to the present embodiment, the master apparatus 2 successively changes the frequency of the single-tone communication carrier output from the frequency division/multiplication circuit 2g. The control circuit 3a of the slave apparatuses 3A through 3Z uses the single-tone communication signal to estimate transmission path characteristics H between the master apparatus 2 and the slave apparatuses 3A through 3Z. Accordingly, communication between the master apparatus 2 and the slave apparatuses 3A through 3Z can be performed using channel ch with satisfactory transmission path characteristics H.

Each of the slave apparatuses 3A through 3Z includes the rectifying circuit 3k. The rectifying circuit 3k measures transmission path characteristics H from DC components. The control circuit 3a estimates channel ch capable of satisfactory communication. The master apparatus 2 and the slave apparatuses 3A through 3Z can confirm a satisfactory channel and start communication.

The slave apparatuses 3A through 3Z may supply rectification output as a power signal from the rectifying circuit 3k to the control circuit 3a or the modulation/demodulation circuit 3c. Operation is available even if rectification output from the rectifying circuit 3f is not appropriately supplied to the circuits 3a, 3c, and 3g.

First Modification of Fifth Embodiment

Figure 24:
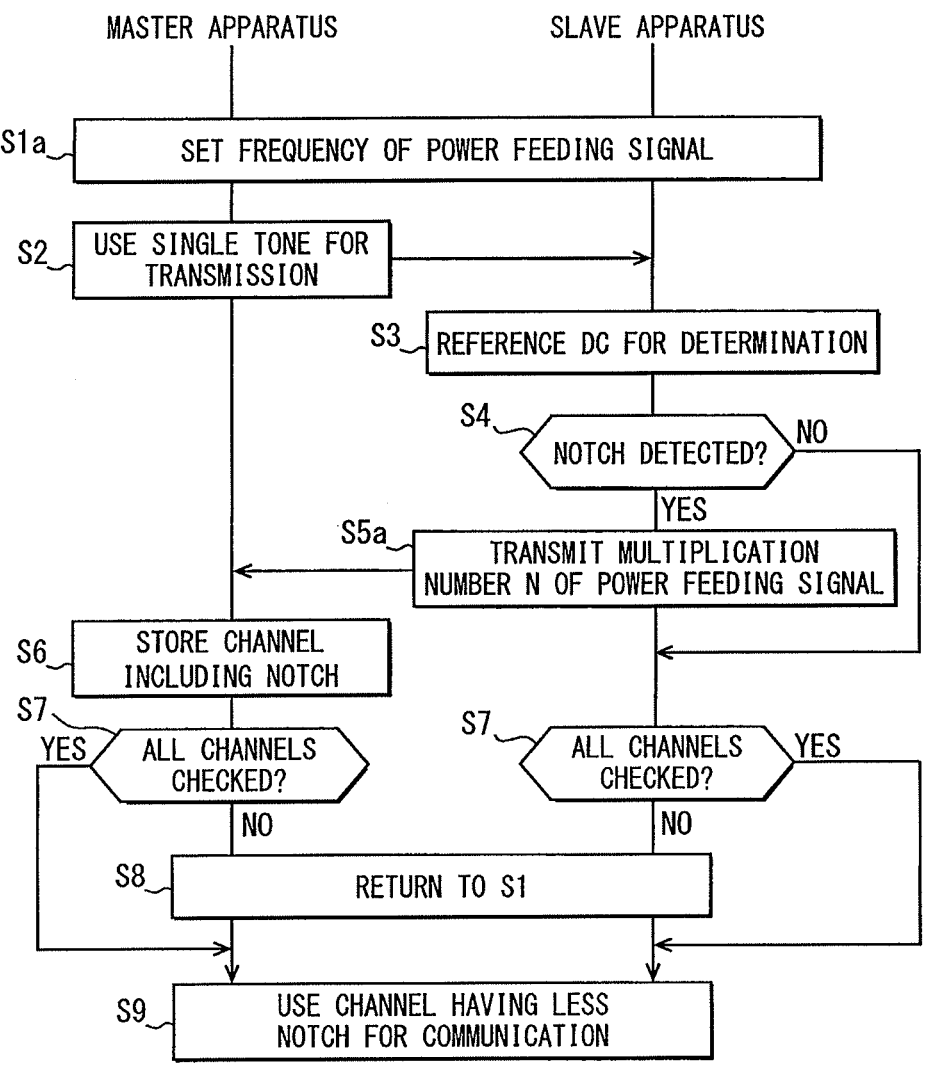
FIG. 24 is a flowchart illustrating operations between a master apparatus and a slave apparatus according to a first modification of the fifth embodiment.

FIG. 24 illustrates a first modification of the fifth embodiment. According to the first modification, the control circuits 2a and 3a for the master apparatus 2 and the slave apparatuses 3A through 3Z use a constant division-ratio/multiplication-ratio for each of the frequency division/multiplication circuits 2g and 3g.

According to the first modification, the high-frequency power generator circuit 2b includes a crystal oscillation circuit as the reference device 2z and a PLL circuit as illustrated in FIG. 6 or FIG. 7. The high-frequency power generator circuit 2b changes division-ratio/multiplication-ratio (multiplication number N) under control of the control circuit 2a, to change the power feeding signal frequency.

According to the flowchart as shown in FIG. 24, the control circuit 2a of the master apparatus 2 changes multiplication number N for the power feeding signal to control frequency f (f0 through f10) of the power feeding signal output from the high-frequency power generator circuit 2b (S1a). The slave apparatuses 3A through 3Z check for a notch according to DC components from the rectifying circuit 3k (S4). If a notch is detected from the determination, the control circuit 3a for the slave apparatuses 3A through 3Z transmits multiplication number N of the power feeding signal to the master apparatus 2 (S5a). For example, in a case where the multiplication number 10 is used for the frequency division/multiplication circuits 2g and 3g when the high-frequency power generator circuit 2b changes power supply frequency f of the power feeding signal from 15 MHz to 25 MHz, transmission path characteristics H in a frequency range from 150 MHz to 250 MHz can be confirmed.

The first modification of the present embodiment changes the frequency of the power feeding signal for communication between the master apparatus 2 and the slave apparatuses 3A through 3Z. The slave apparatuses 3A through 3Z may advantageously use the rectifying circuit 3f to previously store the operational power and then perform the above-described process. As a result, the slave apparatuses 3A through 3Z can operate stably. The present embodiment also provides a working effect almost similar to the above-described embodiments.

Second Modification of Fifth Embodiment

Figure 25:
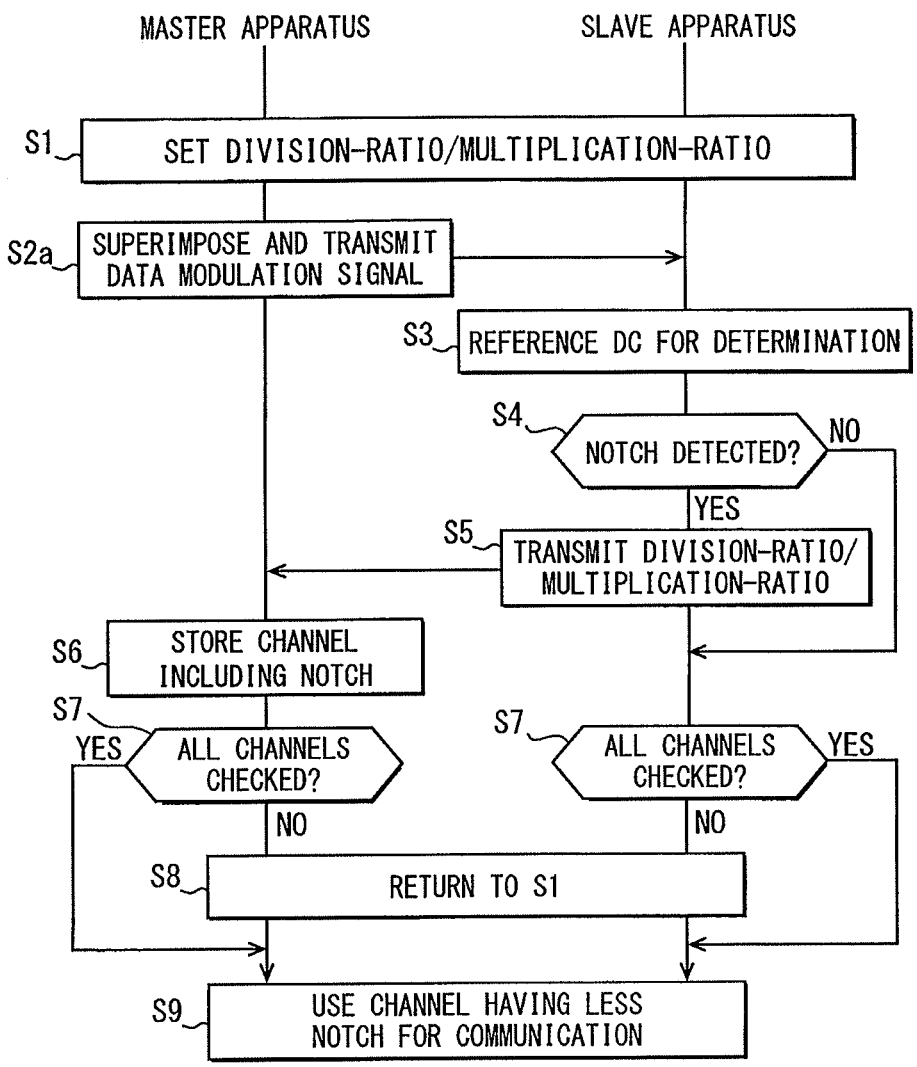
FIG. 25 is a flowchart illustrating operations between a master apparatus and a slave apparatus according to a second modification of the fifth embodiment.
Figure 26:
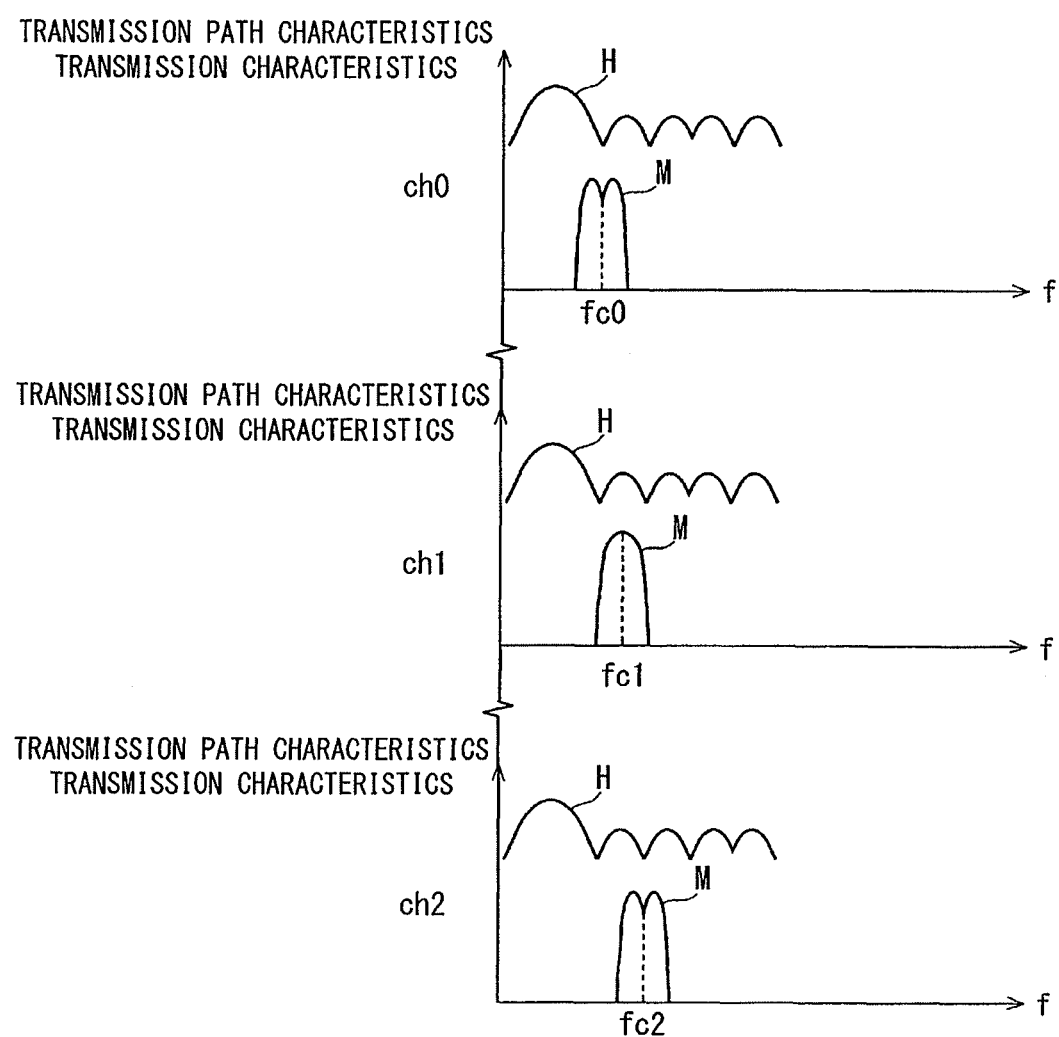
FIG. 26 is a diagram illustrating transmission path characteristics and transmission characteristics when scanning channels.

FIGS. 25 and 26 illustrate a second modification of the fifth embodiment. According to the fifth embodiment, the master apparatus 2 uses the single tone (single frequency) to transmit signals. According to the second modification, the master apparatus 2 allows the modulation/demodulation circuit 2c to modulate data into a communication carrier to generate a data modulation signal and transmits the data modulation signal to the slave apparatuses 3A through 3Z.

In the second modification, as shown in FIG. 25, the master apparatus 2 and the slave apparatuses 3A through 3Z performs a process at S2a instead of the process at S2. In the master apparatus 2, the modulation/demodulation circuit 2c modulates test data. The superimposition/separation circuit 2d superimposes the data modulation signal on the power feeding signal. The master apparatus transmits the power feeding signal to the slave apparatuses 3A through 3Z (S2a). The control circuit 3a for the slave apparatuses 3A through 3Z checks for a notch according to DC components from the rectifying circuit 3k (S4). The master apparatus 2 and the slave apparatuses 3A through 3Z perform this process on all channels ch.

The master apparatus 2 modulates data into a communication carrier to generate a data modulation signal and transmits the data modulation signal to the slave apparatuses 3A through 3Z. The data modulation signal is modulated according to a predetermined data modulation system belonging to digital modulation systems such as BPSK, QPSK, 16QAM, and 64QAM or analog modulation systems such as FM and AM, for example. Therefore, the data modulation signal has a predetermined frequency bandwidth around center frequency f (f0 to f10) for each of the channels (ch0 to ch10).

When a transmission path between the master apparatus 2 and the slave apparatuses 3A through 3Z has frequency characteristics H as illustrated in FIG. 26, transmission characteristics M for each channel ch are subject to effects of transmission path characteristics H of a frequency domain for each ch (ch0 through ch10), and a notch is observed if transmission path characteristics H include a degraded frequency domain. In the example shown in FIG. 26, a notch is observed in channels ch0 and ch2.

According to the second modification, the master apparatus 2 successively changes the communication carrier output from the frequency division/multiplication circuit 2g to frequencies fc0, fc1, fc2, and so on. The modulation/demodulation circuit 2c modulates test data and transmits the modulated test data to the slave apparatus. The control circuit 3a for the slave apparatuses 3A through 3Z uses the data modulation signal as a communication signal to estimate characteristics H of the transmission path between the master apparatus 2 and the slave apparatuses 3A through 3Z. Accordingly, satisfactory channel ch can be used between the master apparatus 2 and the slave apparatuses 3A through 3Z for communication.

Since the second modification modulates data, the channel bandwidth is wider than the fifth embodiment and the first modification of the fifth embodiment. The estimation method according to the second modification can estimate transmission path characteristics H with higher resolution and select appropriate channel ch having more satisfactory transmission characteristics M.

According to the second modification of the fifth embodiment, the master apparatus 2 changes the division-ratio/multiplication-ratio value to change channel ch (see S1 in FIG. 23). Instead, as described in the first modification of the fifth embodiment, the master apparatus 2 may change frequency f of the power feeding signal (see S1a in FIG. 24) to change channel ch.

Sixth Embodiment

Figure 27:
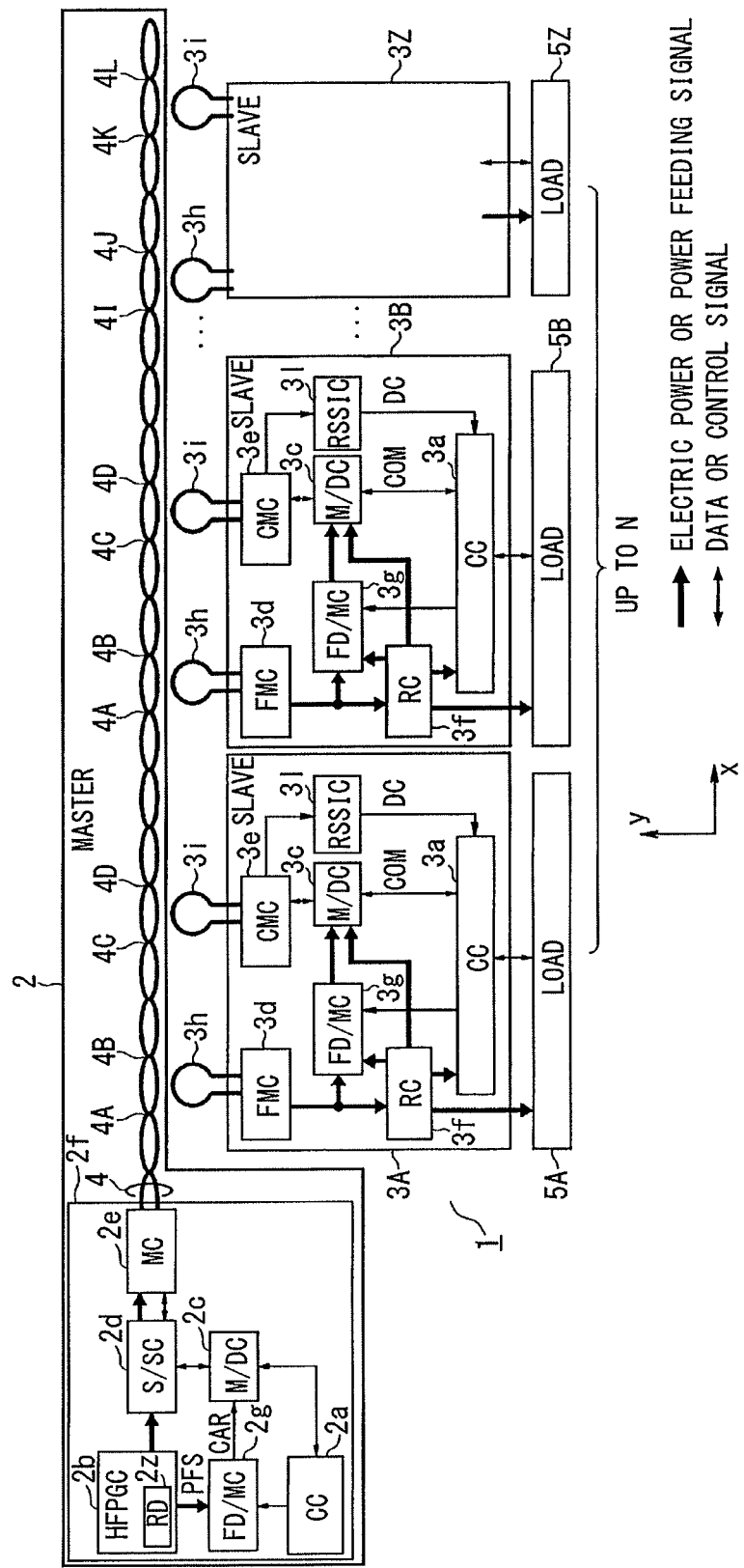
FIG. 27 is a diagram illustrating a vehicular power line communication system according to a sixth embodiment.
Figure 28:
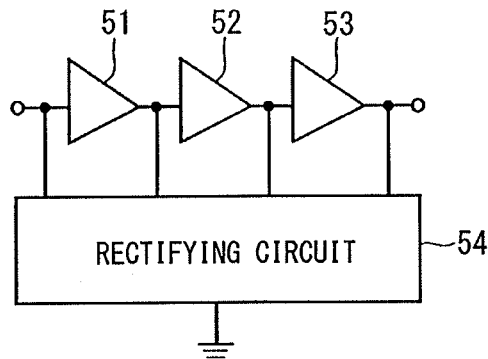
FIG. 28 is a diagram illustrating an example of an RSSI circuit.
Figure 29:
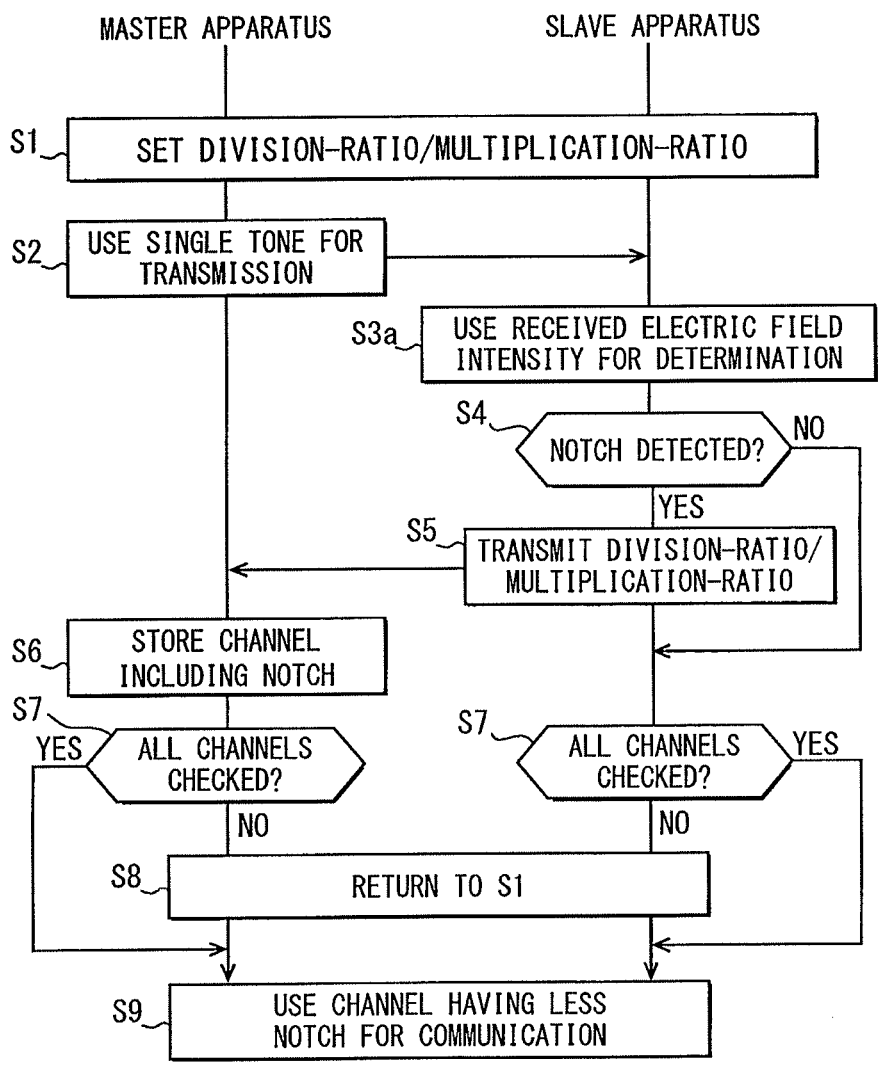
FIG. 29 is a flowchart illustrating operations between a master apparatus and a slave apparatus according to the sixth embodiment.

FIGS. 27 through 29 illustrate a sixth embodiment. As illustrated in FIG. 27, the master apparatus 2 according to the sixth embodiment is configured similarly to the first embodiment. The master apparatus 2 operates similarly to the first embodiment. The sixth embodiment is characterized by operations of the slave apparatuses 3A through 3Z.

As illustrated in FIG. 27, the slave apparatuses 3A through 3Z each have a receive signal strength indicator circuit (RSSI circuit or RSSIC) 3l. The vehicular power line communication system 1 uses the RSSI circuit 3l to estimate transmission path characteristics H according to a single tone. The RSSI circuit 3l measures the received electric field intensity and is exemplified in FIG. 28. As illustrated in FIG. 28, the RSSI circuit 3l includes a combination of amplifiers 51 through 53 and a rectifying circuit 54. Even if the input signal level is low, a limiter amplifier amplifies the input signal level to ensure a wide input range.

The master apparatus 2 and the slave apparatuses 3A through 3Z change division-ratio/multiplication-ratios for the frequency division/multiplication circuits 2g and 3g to sweep channels ch during data modulation and demodulation in the modulation/demodulation circuits 2c and 3c. The RSSI circuit 3l for the slave apparatuses 3A through 3Z measures received electric field intensity data for the data modulation signal transmitted from the master apparatus 2 on each channel ch and outputs the data to the control circuit 3a. The control circuit 3a references the measured data and transmits the division-ratio/multiplication-ratio as data causing a notch during data reception on each channel to the master apparatus 2.

FIG. 29 is a flowchart illustrating operations between the master apparatus 2 and each of the slave apparatuses 3A through 3Z. The sixth embodiment differs from the fifth embodiment (see FIG. 23) in that the control circuit 3a in each of the slave apparatuses 3A through 3A performs a process at S3a instead of the process at S3. As shown in FIG. 29, the control circuit 3a in the slave apparatuses 3A through 3Z checks for a notch using received electric field intensity data measured by the RSSI circuit 3l (S3a). As a result, the vehicular power line communication system 1 can estimate channel ch capable of satisfactory communication.

According to the sixth embodiment, each of the slave apparatuses 3A through 3Z includes the RSSI circuit 3l and measure the received electric field intensity using the RSSI circuit 3l. The control circuit 3a estimates channel ch capable of satisfactory communication. The master apparatus 2 and the slave apparatuses 3A through 3Z can start data communication after confirming satisfactory channel ch. The present embodiment also provides a working effect almost similar to the above-described embodiments.

First Modification of Sixth Embodiment

Figure 30:
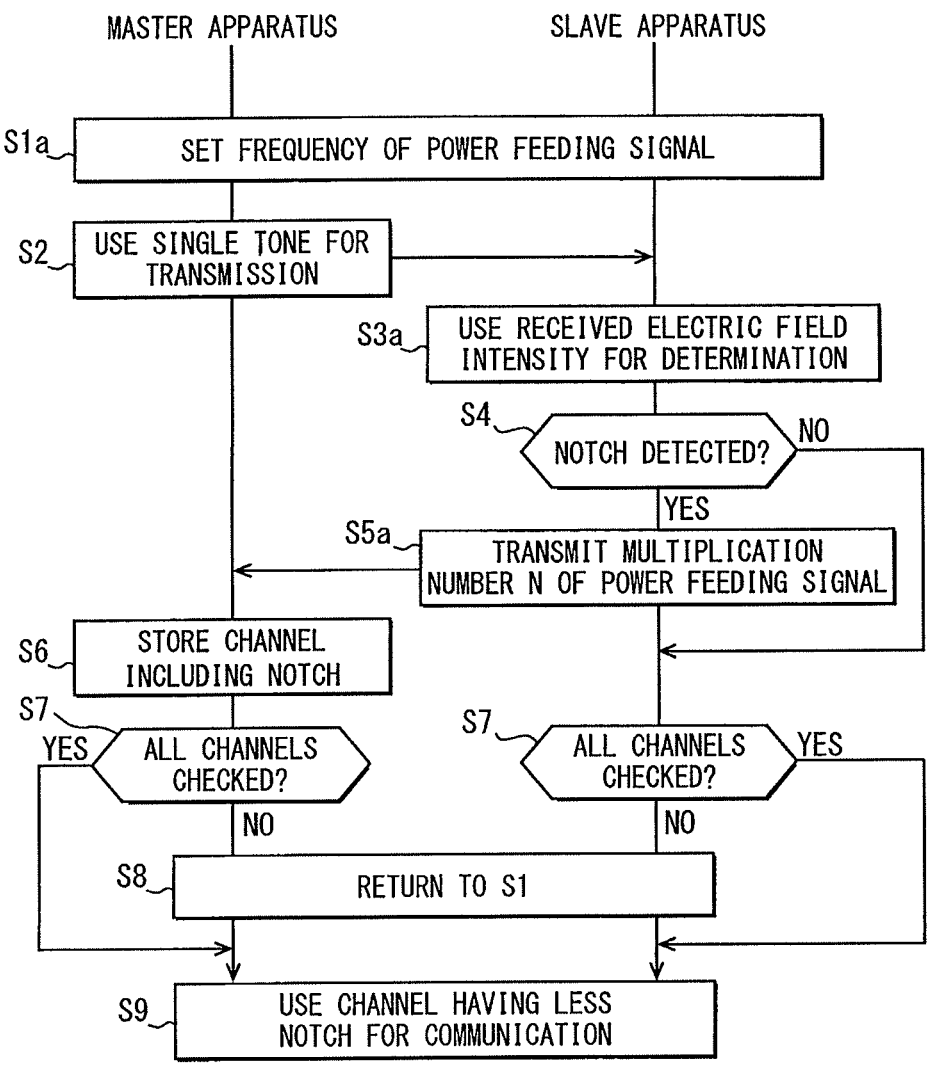
FIG. 30 is a flowchart illustrating operations between a master apparatus and a slave apparatus according to a first modification of the sixth embodiment.

FIG. 30 illustrates a first modification of the sixth embodiment. According to the first modification, the control circuits 2a and 3a for the master apparatus 2 and the slave apparatuses 3A through 3Z use a constant division-ratio/multiplication-ratio for each of the frequency division/multiplication circuits 2g and 3g.

According to the modification of the present embodiment, the high-frequency power generator circuit 2b includes a crystal oscillation circuit as the reference device 2z and a PLL circuit as illustrated in FIG. 6 or FIG. 7. Changing the division-ratio/multiplication-ratio (multiplication number N) enables the high-frequency power generator circuit 2b to change the power feeding signal frequency.

FIG. 30 is a flowchart illustrating operations between the master apparatus 2 and each of the slave apparatuses 3A through 3Z. The control circuit 2a for the master apparatus 2 changes multiplication number N for the power feeding signal to control frequency f (f0 through f10) of the power feeding signal output from the high-frequency power generator circuit 2b (S1a). The slave apparatuses 3A through 3Z allow the RSSI circuit 3l to measure the received electric field intensity (S3a) and uses the measured data to check for a notch (S4). If a notch is detected, the control circuit 3a in the slave apparatuses 3A through 3Z transmits multiplication number N of the power feeding signal to the master apparatus 2 (S5a). For example, in a case where multiplication number is set to 10 for the frequency division/multiplication circuits 2g and 3g when the high-frequency power generator circuit 2b changes power supply frequency f of the power feeding signal from 15 MHz to 25 MHz, transmission path characteristics in a frequency range from 150 MHz to 250 MHz can be confirmed.

The communication between the master apparatus 2 and the slave apparatuses 3A through 3Z changes power feeding signal frequencies. The slave apparatuses 3A through 3Z may advantageously use the rectifying circuit 3f to previously store the operational power and then perform the above-described process. As a result, the slave apparatuses 3A through 3Z can operate stably. The present embodiment also provides a working effect almost similar to the above-described embodiments.

Second Modification of Sixth Embodiment

Figure 31:
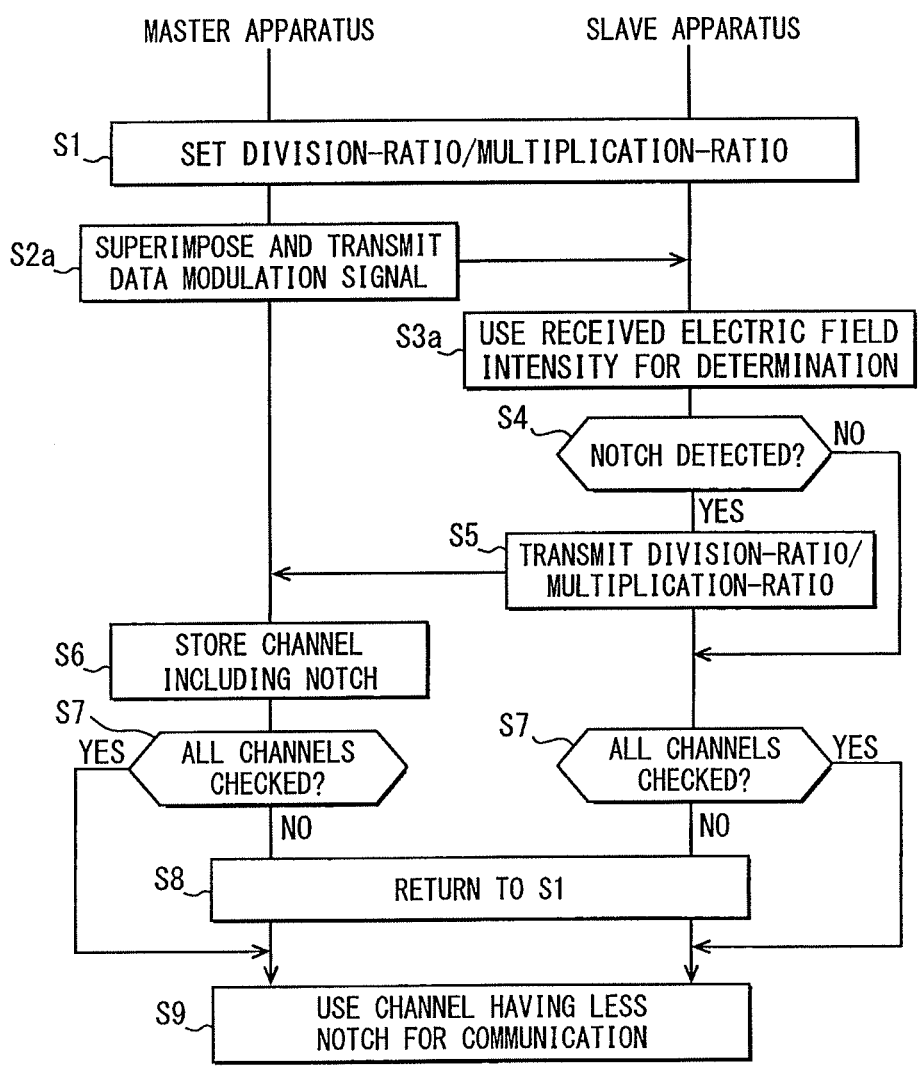
FIG. 31 is a flowchart illustrating operations between a master apparatus and a slave apparatus according to a second modification of the sixth embodiment.

FIG. 31 illustrates a second modification of the sixth embodiment. According to the sixth embodiment, the master apparatus 2 uses the single tone (single frequency) to transmit signals. According to the second modification, the master apparatus 2 allows the modulation/demodulation circuit 2c to modulate data into a communication carrier to generate a data modulation signal and transmits the data modulation signal to the slave apparatuses 3A through 3Z.

As illustrated in FIG. 31, the control circuit 2a in the master apparatus 2 performs a process at S2a instead of the process at S2. The master apparatus 2 allows the modulation/demodulation circuit 2c to modulate test data. The superimposition/separation circuit 2d superimposes the data modulation signal on the power feeding signal. The master apparatus transmits the power feeding signal to the slave apparatuses 3A through 3Z (S2a). The control circuit 3a for the slave apparatuses 3A through 3Z checks for a notch according to the received electric field intensity from the RSSI circuit 3l (S4). The master apparatus 2 and the slave apparatuses 3A through 3Z perform this process on all channels ch. The other flow is similar to the above-described embodiments (especially the second modification of the fifth embodiment) and a description is omitted for simplicity.

The second modification of the sixth embodiment provides a working effect almost similar to the second modification of the fifth embodiment. According to the second modification of the sixth embodiment, the frequency domain bandwidth for channels is wider than the sixth embodiment and the first modification of the sixth embodiment. The second modification of the sixth embodiment can estimate transmission path characteristics H with higher resolution and select appropriate channel ch having more satisfactory transmission characteristics M.

According to the second modification of the sixth embodiment, the master apparatus 2 changes channel ch by changing value N of the division-ratio/multiplication-ratio at S1. Instead, as described in the first modification of the sixth embodiment, the master apparatus 2 may change channel ch by changing frequency f of the power feeding signal.

Seventh Embodiment

Figure 32:
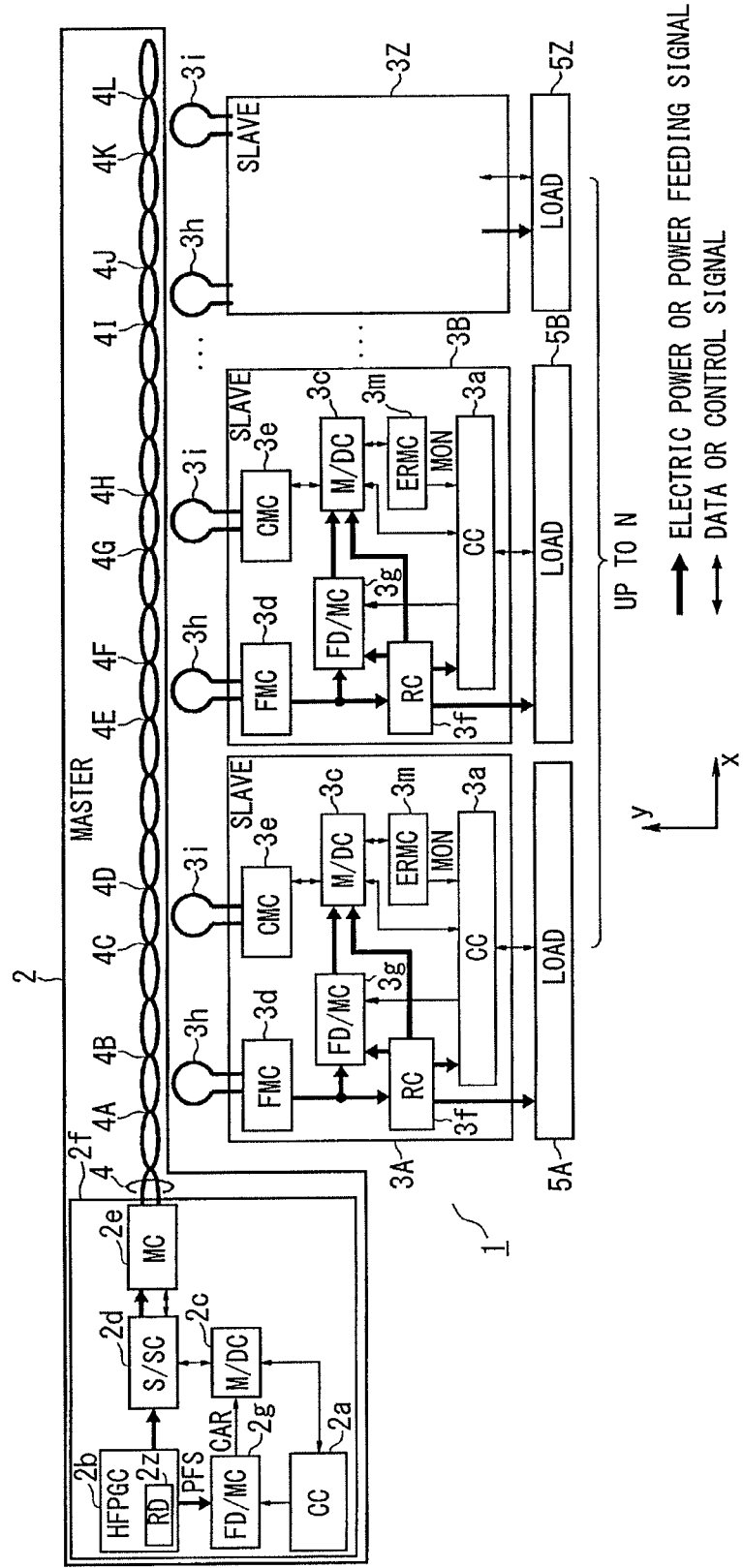
FIG. 32 is a diagram illustrating a vehicular power line communication system according to a seventh embodiment.
Figure 33:
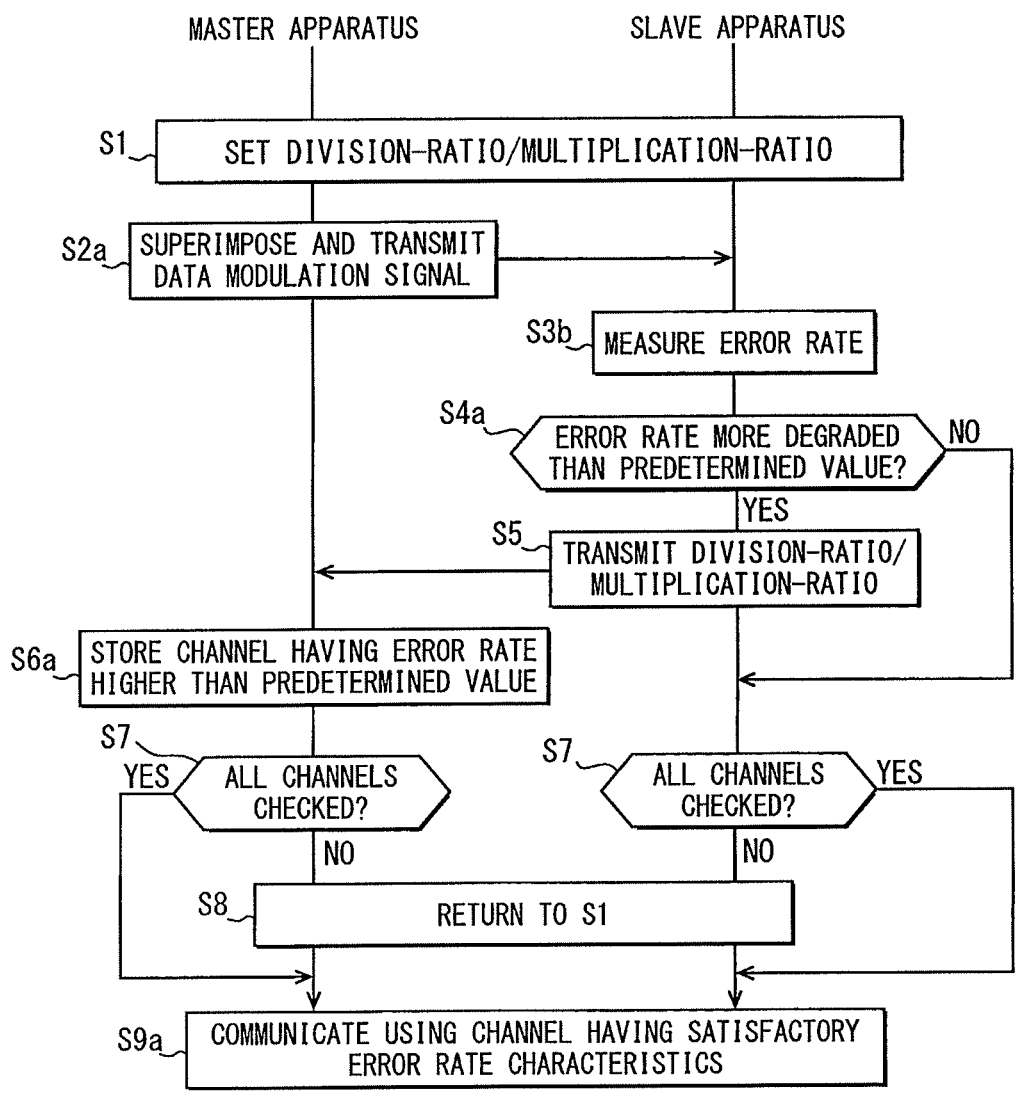
FIG. 33 is a flowchart illustrating operations between a master apparatus and a slave apparatus according to the seventh embodiment.

FIGS. 32 and 33 illustrate a seventh embodiment. As illustrated in FIG. 32, the master apparatus 2 according to the seventh embodiment is configured similarly to the first embodiment. The master apparatus 2 operates similarly to the first embodiment. The seventh embodiment is characterized by operations of the slave apparatuses 3A through 3Z.

As illustrated in FIG. 32, each of the slave apparatuses 3A through 3Z includes an error rate monitor circuit (ERMC) 3m. The vehicular power line communication system 1 uses the error rate monitor circuit 3m to estimate transmission path characteristics H between the master apparatus 2 and the slave apparatuses 3A through 3Z.

The master apparatus 2 and the slave apparatuses 3A through 3Z change division-ratio/multiplication-ratios for the frequency division/multiplication circuits 2g and 3g to sweep channels during data modulation and demodulation in the modulation/demodulation circuits 2c and 3c. On each channel ch, the error rate monitor circuit 3m measures an error rate for the data modulation signal transmitted from the master apparatus 2 and outputs a measurement result (MON) to the control circuit 3a. The control circuit 3a references the measurement result to find a division-ratio/multiplication-ratio for channel ch having a data rate more degraded than the predetermined value and transmits the division-ratio/multiplication-ratio as data to the master apparatus 2.

FIG. 33 is a flowchart illustrating operations between the master apparatus 2 and each of the slave apparatuses 3A through 3Z. The seventh embodiment differs from the fifth or sixth embodiment in that processes at S3b, S4a, S6a, and S9a are performed instead of the processes at S3, 84, S6, and S9. As illustrated in FIG. 33, the slave apparatuses 3A through 3Z allow the error rate monitor circuit 3m to measure an error rate (S3b). The control circuit 3a determines whether the error rate measurement result is more degraded than a predetermined value (S4a). The slave apparatuses 3A through 3Z transmit division-ratio/multiplication-ratio N (channel ch) having an error rate higher than the predetermined value to the master apparatus 2 (S5).

The control circuit 2a of the master apparatus 2 stores channel ch having an error rate higher than the predetermined value (S6a). The control circuit 2a finds channel ch having satisfactory error rate characteristics from all channels and uses the channel ch for communication (S9a). The vehicular power line communication system 1 can estimate channel ch that indicates a low error rate and is capable of satisfactory communication. The master apparatus 2 and the slave apparatuses 3A through 3Z can start communication after confirming channel ch capable of satisfactory communication.

According to the seventh embodiment, each of the slave apparatuses 3A through 3Z includes the error rate monitor circuit 3m. Based on the result of detecting an error rate, the error rate monitor circuit 3m estimates transmission path characteristics H between the master apparatus 2 and the slave apparatuses 3A through 3Z and estimates channel ch that indicates a low error rate and is capable of satisfactory communication. The master apparatus 2 and the slave apparatuses 3A through 3Z can start data communication after confirming satisfactory channel ch. The present embodiment also provides a working effect almost similar to the above-described embodiments.

According to the seventh embodiment, the master apparatus 2 changes channel ch by changing value N of the division-ratio/multiplication-ratio at S1. Instead, the master apparatus 2 may change channel ch by changing frequency f of the power feeding signal.

Eighth Embodiment

FIGS. 34 through 37 illustrate an eighth embodiment. As characteristics of the eighth embodiment, the master apparatus 2 modulates a power feeding signal into data and transmits the data as a sub-channel to the slave apparatuses 3A through 3Z. The master apparatus 2 thereby transmits information about the frequency of a communication carrier to sweep to the slave apparatuses 3A through 3Z.

Frequency f of the power feeding signal may be lower than frequencies of data modulation signals from the modulation/demodulation circuits 2c and 3c. In such a case, modulating data into a power feeding signal enables relatively low-speed communication. According to the present embodiment, the master apparatus 2 acquires frequency information about the communication carrier for a data modulation signal as data, modulates the data into a power feeding signal, and transmits the power feeding signal to the slave apparatuses 3A through 3Z. Even if no communication channel is available, if electric power can be supplied, a sub-channel using the power supply frequency (or a frequency approximate to the power supply frequency) can be provided and the master-slave communication can be ensured.

Figure 34:
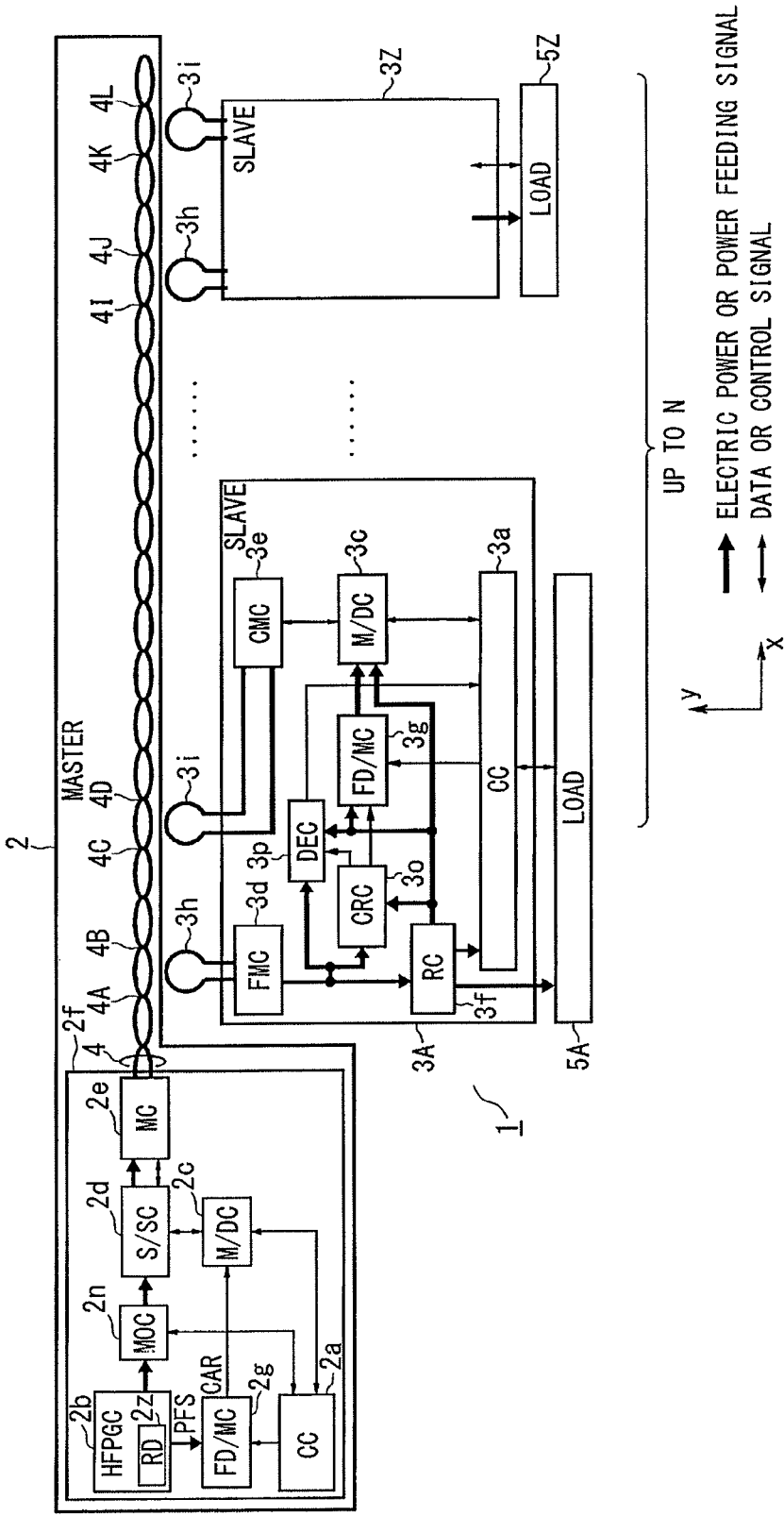
FIG. 34 is a diagram illustrating a vehicular power line communication system according to an eighth embodiment.

As illustrated in FIG. 34, a modulation circuit (MOC) 2n is connected between the high-frequency power generator circuit 2b and the superimposition/separation circuit 2d in the master apparatus 2. The modulation circuit 2n modulates a power feeding signal output from the high-frequency power generator circuit 2b according to a predetermined modulation system (e.g., BPSK). The predetermined modulation system is available as digital modulations (e.g., BPSK, QPSK, 16QAM, and 64QAM) and analog modulations (e.g., FM and AM). In this case, the BPSK modulation system is preferable because the only need is to be able to estimate transmission path characteristics H and the communication may be available at a low speed.

Figure 35:
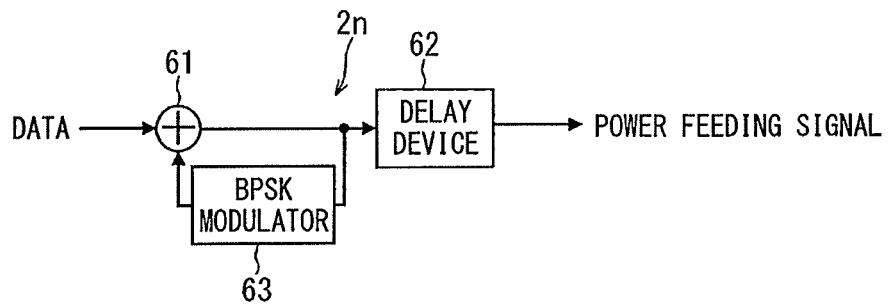
FIG. 35 is a diagram illustrating a modulation circuit in a master apparatus according to the eighth embodiment.

The vehicular power line communication system 1 uses the sub-channel to estimate transmission path characteristics H. The modulation circuit 2n uses a power feeding signal to modulate data transmitted from the control circuit 2a. As illustrated in FIG. 35, the modulation circuit 2n is configured as a differentially-encoded BPSK modulator including a combination of an exclusive OR circuit 61, a delay device 62, and a BPSK modulator 63. The modulation circuit 2n outputs a power feeding signal generated by modulating data according to BPSK. When not using the sub-channel, the master apparatus 2 disables the modulation process of the modulation circuit 2n and directly transmits a power feeding signal output from the high-frequency power generator circuit 2b to the superimposition/separation circuit 2d.

Figure 36:
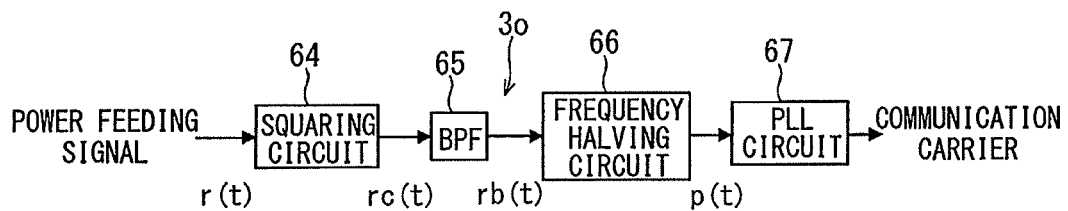
FIG. 36 is a diagram illustrating a carrier recovery circuit in a slave apparatus according to the eighth embodiment.

As illustrated in FIG. 34, each of the slave apparatuses 3A through 3Z includes a carrier recovery circuit (CRC) 3o and a demodulation circuit (DEC) 3p subsequent to the feeding matching circuit 3d. The carrier recovery circuit 3o operates on an electric signal supplied from the rectifying circuit 3f. The carrier recovery circuit 3o recovers only a communication carrier from the power feeding signal modulated by the modulation circuit 2n in the master apparatus 2. As illustrated in FIG. 36, the carrier recovery circuit 3o is configured by subordinately connecting a squaring circuit 64, a BPF 65, a frequency halving circuit 66, and a PLL circuit 67. For example, equation (2) expresses BPSK modulation data. In the following equations, fc represents the carrier frequency.

$$r(t)=A\cos(2\pi f_c t+\phi_m), (\phi=0,\pi) \qquad (2)$$

When the squaring circuit squares BPSK modulation data, the signal can be expressed by the following equation (3).

$$r(t)=A\cos(2\pi f_c t+\phi_m), (\phi=0,\pi) \qquad (3)$$

When the BPF filters the signal to generate a signal having a frequency twice the frequency of the power feeding signal as shown by the following equation (4).

$$rb(t) = \frac{A^2}{2}\cos(4\pi f_c t) \qquad (4)$$

When the frequency halving circuit halves the signal and the PLL circuit locks the phase for stable output, the power feeding signal can be recovered as shown by the following equation (5).

$$p(t)=\cos(2\pi f_c t) \qquad (5)$$

The frequency halving circuit 66 and the PLL circuit 67 may be omitted as needed. The carrier recovery circuit 3o is configured as described above and outputs the communication carrier to the frequency division/multiplication circuit 3g as illustrated in FIG. 34. Similarly to the above-described embodiments, the frequency division/multiplication circuit 3g outputs the communication carrier to the modulation/demodulation circuit 3c according to the control signal (division-ratio/multiplication-ratio) from the control circuit 3a. The modulation/demodulation circuit 3c uses this communication carrier for modulation and demodulation.

Figure 37:
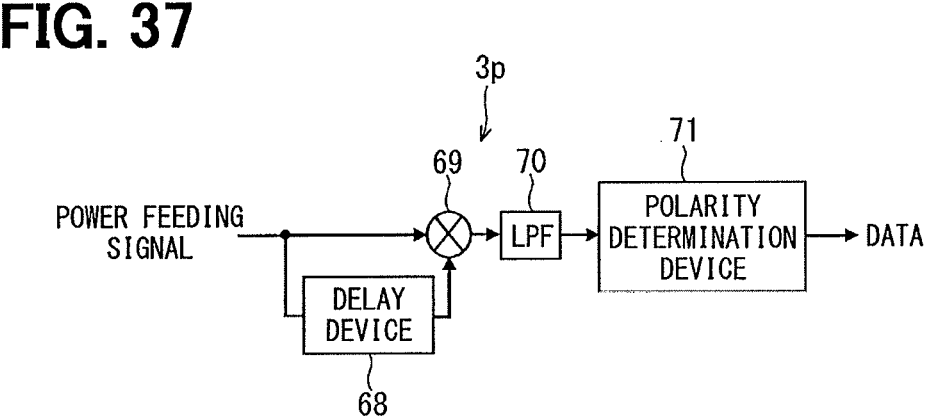
FIG. 37 is a diagram illustrating a demodulation circuit in the slave apparatus according to the eighth embodiment.

The demodulation circuit 3p operates on an electric signal from the rectifying circuit 3f and demodulates data from the power feeding signal modulated by the modulation circuit 2n in the master apparatus 2. As illustrated in FIG. 37, the demodulation circuit 3p includes a delay device 68, a multiplier 69, an LPF 70, a polarity determination device 71, and a level conversion circuit as needed. The demodulation circuit 3p is configured as a differentially-encoded BPSK delay detection circuit. The demodulation circuit 3p demodulates data using the carrier from the carrier recovery circuit 3o at the sub-channel and outputs the demodulated data to the control circuit 3a.

The control circuit 3a can refer the sub-channel demodulation data from the demodulation circuit 3p to acquire frequency information about the communication carrier. The control circuit 3a can refer the frequency information about the communication carrier to provide the frequency division/multiplication circuit 3g with a division-ratio/multiplication-ratio corresponding to the frequency information. After completion of the channel estimation, the master apparatus 2 and the slave apparatuses 3A through 3Z use the modulation/demodulation circuit 3c for high-speed data communication without using the sub-channel.

The present embodiment enables communication between the master apparatus 2 and the slave apparatuses 3A through 3Z using the sub-channel as modulation of data into the power feeding signal. This enables communication of data different from the main channel (channel ch described in the above-described embodiments).

According to the present embodiment, the master apparatus 2 modulates data into the power feeding signal and transmits frequency information about the communication carrier to the slave apparatuses 3A through 3Z. The slave apparatuses 3A through 3Z can refer the frequency information about the communication carrier transmitted from the master apparatus 2 to provide a division-ratio/multiplication-ratio for the frequency division/multiplication circuit 3g. The master apparatus 2 and the slave apparatuses 3A through 3Z can start high-speed data communication using the modulation/demodulation circuits 2c and 3c.

Ninth Embodiment

Figure 38:
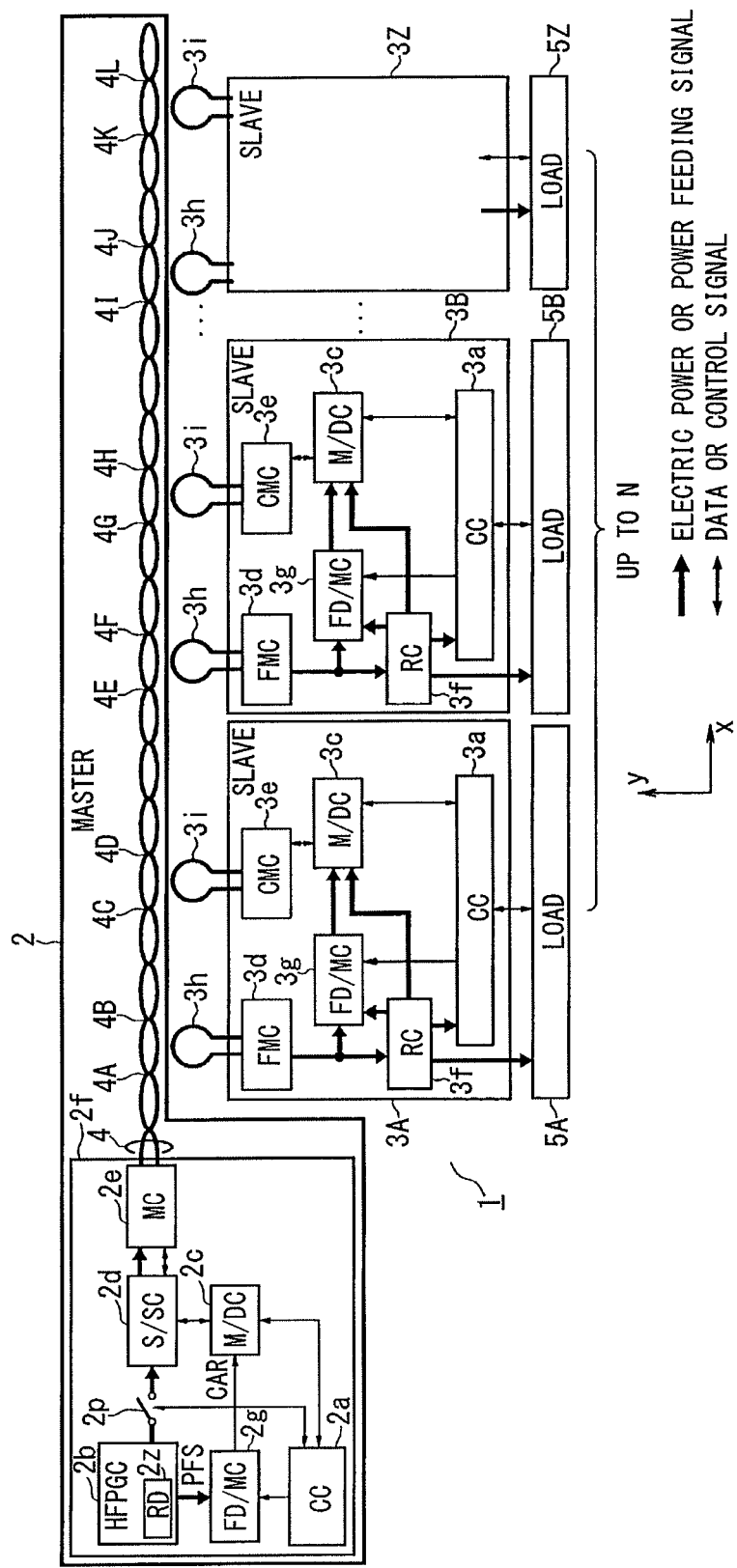
FIG. 38 is a diagram illustrating a vehicular power line communication system according to a ninth embodiment.
Figure 39:
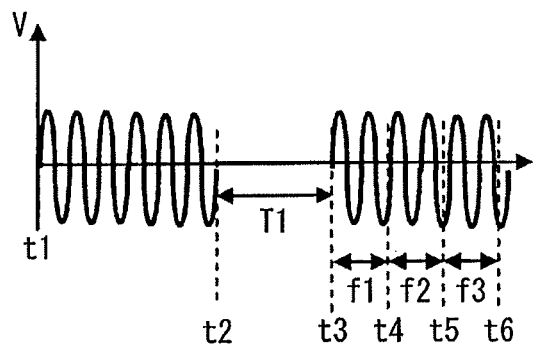
FIG. 39 is a diagram illustrating temporal allocation of power feeding signal frequencies.
Figure 40:
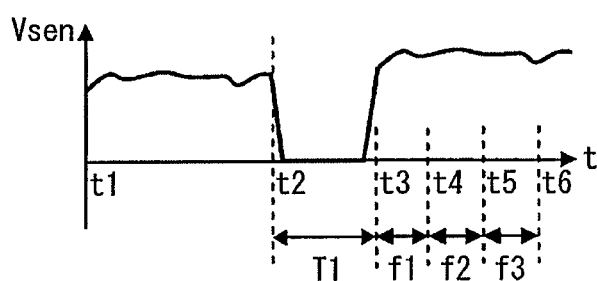
FIG. 40 is a diagram illustrating a reception signal of the power feeding signal.

FIGS. 38 through 40 illustrate a ninth embodiment. As illustrated in FIG. 38, the master apparatus 2 includes a control switch 2p between the high-frequency power generator circuit 2b and the superimposition/separation circuit 2d. The control switch 2p is turned on or off according to the control signal from the control circuit 2a. Normally, the control switch 2p is on.

The above-described embodiments sweep channels ch by changing division-ratio/multiplication-ratios for the frequency division/multiplication circuits 2g and 3g or by changing frequency f of the power feeding signal from the high-frequency power generator circuit 2b. According to the ninth embodiment, the control circuit 2a of the master apparatus 2 turns off the control switch 2p to temporarily stop transmitting the power feeding signal. Thereafter, the control circuit 2a successively changes the power feeding signal frequency around a predetermined frequency (e.g., 13.56 MHz) to synchronize the power feeding signal frequency with the slave apparatuses 3A through 3Z.

As illustrated in FIG. 39, the master apparatus 2 temporarily inactivates the power feeding signal from time t1 to time t2. After lapse of inactivation period T1, the master apparatus 2 successively changes the power feeding signal frequency to f1, f2, f3, and so on. The slave apparatuses 3A through 3Z always receive the power feeding signal. If the rectifying circuit 3f stops supplying the power feeding signal during inactivation period T1, the slave apparatuses 3A through 3Z receive this no-feeding period as a reset signal.

Thereafter, the slave apparatuses 3A through 3Z change the power feeding signal frequency to f1, f2, f3, and so on between times t3 and t4, between times t4 and t5, and between times t5 and t6, which are predetermined between the master apparatus 2 and the slave apparatuses 3A through 3Z. The master apparatus 2 and the slave apparatuses 3A through 3Z can synchronize power feeding signal frequencies f1, f2, f3, and so on.

FIG. 40 illustrates a reception signal (an output voltage from the rectifying circuit 3f) of the power feeding signal. The control circuit 3a for the slave apparatuses 3A through 3Z is reset when the output voltage for the power feeding signal drops. After the reset, the power feeding signal frequency is successively set to f1, f2, f3, and so on.

The slave apparatuses 3A through 3Z receive the power feeding signal set to frequencies f1, f2, f3, and so on via the feeding matching circuit 3d and operate according to the power feeding signal. At this time, the frequency division/multiplication circuit 3g divides or multiplies the power feeding signal frequency and outputs the result as a communication carrier to the modulation/demodulation circuit 3c. The modulation/demodulation circuit 3 modulates or demodulates data using the communication carrier output from the frequency division/multiplication circuit 3g.

Operations of the present embodiment are summarized as follows. The master apparatus 2 resets the power feeding signal output from the high-frequency power generator circuit 2b to be non-feeding. The slave apparatuses 3A through 3Z accept the non-feeding period as a reset signal. Thereafter, the control circuit 2a of the master apparatus 2 allows the high-frequency power generator circuit 2b to output the power feeding signal. The control circuit 2a changes the power feeding signal frequency at every predetermined period from the output timing and transmits the frequency to the slave apparatuses 3A through 3Z.

Because the frequency of the power feeding signal from the high-frequency power generator circuit 2b change successively, the frequency of the power feeding signal that are received by the slave apparatuses 3A through 3Z changes successively. The frequency division/multiplication circuit 3g divides or multiplies the power feeding signal frequency to generate the communication carrier for the modulation/demodulation circuit 3c. In such a case, the master apparatus 2 and the slave apparatuses 3A through 3Z can synchronize power feeding signal frequencies.

Other Embodiments

Figure 41:
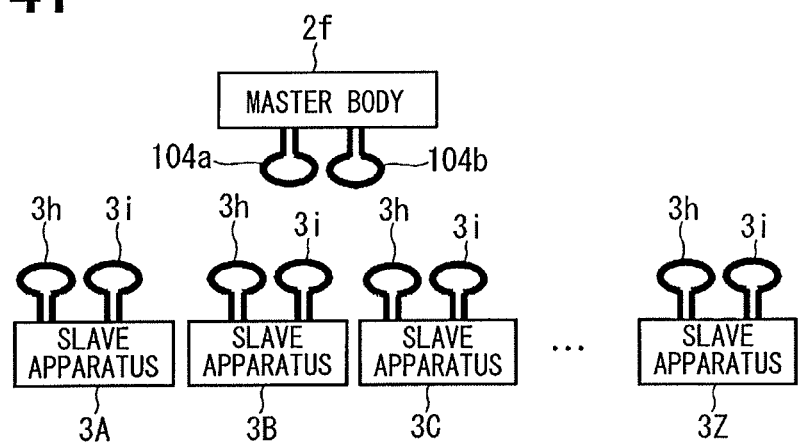
FIG. 41 is a diagram illustrating a vehicular power line communication system according to another embodiment.

According to the above-described embodiments, the power-line wireless communication using the twisted pair wire 4 connects the master apparatus 2 with the slave apparatuses 3A through 3Z. Instead, a configuration as illustrated in FIG. 41 may be available. In FIG. 41, the master apparatus 2 includes antennas 104a and 104b. The antenna 104a matches the frequency band for a power feeding signal. The antenna 104b matches the frequency band for a data modulation and demodulation signal. The master apparatus 2 uses the antennas 104a and 104b for wireless communication with the slave apparatuses 3A through 3Z. Each of the slave apparatuses 3A through 3Z includes antennas 3h and 3i. The antenna 3h matches the frequency band for a power feeding signal. The antenna 3i matches the frequency band for a data modulation and demodulation signal. The slave apparatuses 3A through 3Z use the antennas 3h and 3i for wireless communication with the master apparatus 2.

There has been described the example of separately configuring the antennas 104a and 104b, that is, the antenna 104a for the master apparatus 2 to output power feeding signals and the antenna 104b to input and output data modulation and demodulation signals. The antennas 104a and 104b may be integrated if the antennas 104a and 104b can simultaneously match two frequency bands for a power feeding signal and a data modulation and demodulation signal. In this case, the matching circuit 2e may be used to match the antennas 104a and 104b so as to discriminate between the power feeding signal frequency and the data communication signal frequency for signal input and output.

Figure 42:
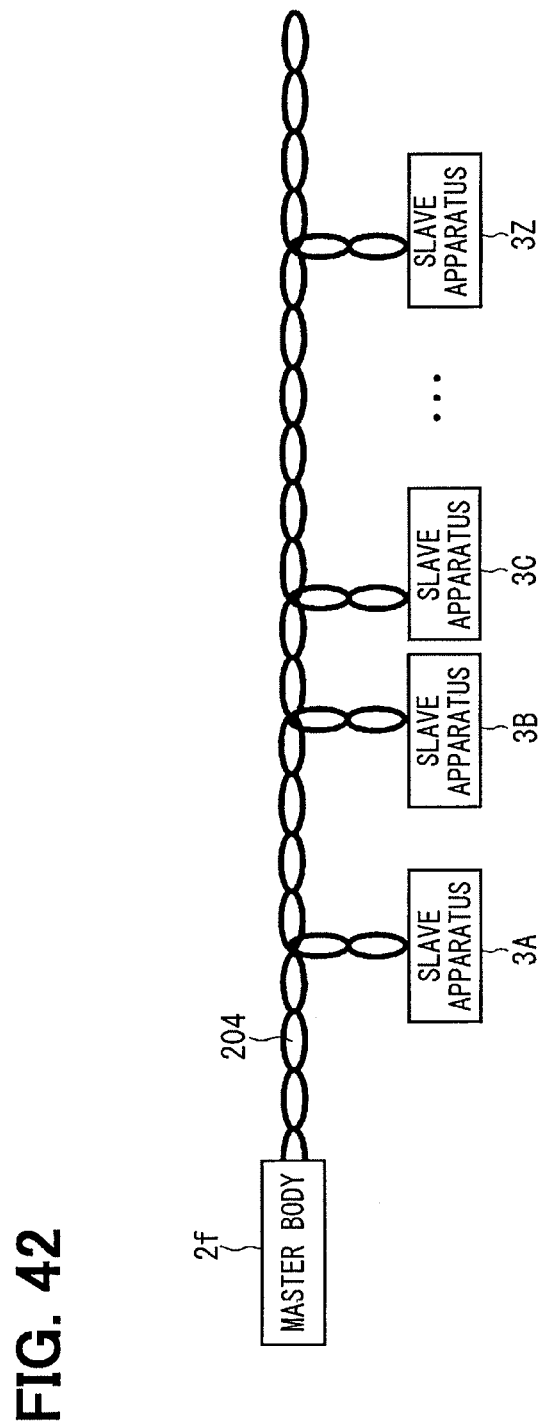
FIG. 42 is a diagram illustrating a vehicular power line communication system according to another embodiment.
Figure 43:
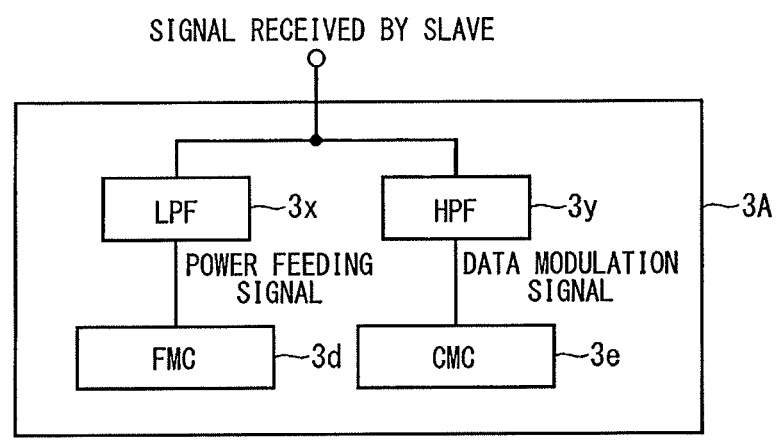
FIG. 43 is a diagram illustrating an input stage of a slave apparatus according to another embodiment.

The master apparatus 2 and the slave apparatuses 3A through 3Z may be wirelessly connected to each other. In this case, as illustrated in FIG. 42, a wired communication line 204 is provided to transmit power feeding signals and data modulation and demodulation signals from the master apparatus 2 to the slave apparatuses 3A through 3Z. The communication line 204 transmits power feeding signals and data modulation and demodulation signals. FIG. 43 illustrates a configuration of the signal input stage for the slave apparatuses 3A through 3Z. The slave apparatuses 3A through 3Z use the communication line 204 to discriminate between the power feeding signal frequency and the data communication signal frequency. The slave apparatuses 3A through 3Z receive the power feeding signal and the data communication signal using LPF3x and HPF3y (corresponding to the separation portion) provided by combining a CR circuit or an operational amplifier. The configuration is applicable to bus, star, and other various topologies.

The control circuit 2a for the master apparatus 2 or the control circuit 3a for the slave apparatuses 3A through 3Z may estimate transmission path characteristics H and may set channel ch between the master apparatus 2 and the slave apparatuses 3A through 3Z.

What is claimed is:

1. A vehicular power line communication system comprising a master apparatus and a slave apparatus communicating with the master apparatus,
wherein the master apparatus includes:
a reference device generating a reference signal having a reference frequency;
a power feeding signal generation portion dividing or multiplying a frequency of the reference signal from the reference device to generate a power feeding signal, the dividing or multiplying including dividing or multiplying by one;
a first communication carrier generation portion dividing or multiplying a frequency of the reference signal from the reference device to generate a first communication carrier within a frequency band that is different from a frequency band for the power feeding signal;
a communication signal generation portion generating a communication signal having a data communication frequency band using the first communication carrier; and
a superimposition portion superimposing the communication signal from the communication signal generation portion on the power feeding signal from the power feeding signal generation portion to generate a superimposition signal, the superimposition portion transmitting the superimposition signal to the slave apparatus,
wherein the slave apparatus includes:
a separation portion separating the superimposition signal from the superimposition portion into a power feeding signal having a frequency band for the power feeding signal generation portion and a communication signal having the data communication frequency band;
a second communication carrier generation portion dividing or multiplying a frequency of the power feeding signal separated by the separation portion to generate a second communication carrier; and
a modulation and demodulation portion modulating and demodulating a data communication signal to be communicated with the master apparatus using the second communication carrier.

2. The vehicular power line communication system according to claim 1, further comprising:
a received electric field intensity measuring portion measuring data corresponding to received electric field intensity of the communication signal separated by the separation portion; and
an estimation portion estimating transmission path characteristics between the master apparatus and the slave apparatus using the data corresponding to the received electric field intensity.

3. The vehicular power line communication system according to claim 1, further comprising an estimation portion,
wherein the master apparatus includes a change portion successively changing the first communication carrier for the communication signal generation portion to generate a single-frequency communication signal, and
wherein the estimation portion estimates transmission path characteristics between the master apparatus and the slave apparatus using the single-frequency communication signal that is successively changed by the change portion and is received by the slave apparatus.

4. The vehicular power line communication system according to claim 1, further comprising an estimation portion,
wherein the master apparatus includes a change portion successively changing the first communication carrier for the communication signal generation portion to generate a data modulation signal treated with date modulation;
wherein the estimation portion estimates transmission path characteristics between the master apparatus and the slave apparatus using the data modulation signal that is successively changed by the change portion and is received by the slave apparatus.

5. The vehicular power line communication system according to claim 1, further comprising an estimation portion,
wherein the master apparatus includes a change portion successively changing the first communication carrier for the communication signal generation portion to generate a data modulation signal treated with date modulation;
wherein the modulation and demodulation portion demodulates the data modulation signal successively changed by the change portion and received by the slave apparatus using the second communication carrier,
wherein the slave apparatus includes an error rate detection portion detecting an error rate of data demodulated by the modulation and demodulation portion, and
wherein the estimation portion estimates transmission path characteristics between the master apparatus and the slave apparatus based on the error rate detected by the error rate detection portion.

6. The vehicular power line communication system according to claim 1, further comprising:
a rectification portion rectifying and smoothing the communication signal separated by the separation portion to acquire DC component data; and
an estimation portion estimating transmission path characteristics between the master apparatus and the slave apparatus using the DC component data.

7. The vehicular power line communication system according to claim 1,
wherein the master apparatus includes an instruction portion,
wherein the instruction portion transmits an output instruction to the power feeding signal generation portion after resetting the power feeding signal from the power feeding signal generation portion so as to be non-feed; and
wherein the power feeding signal generation portion changes a frequency of the power feeding signal at a predetermined period after the power feeding signal generation portion receives the output instruction from the instruction portion.

8. The vehicular power line communication system according to claim 1,
wherein the master apparatus includes a modulation portion modulating the power feeding signal from the power feeding signal generation portion to generate a sub-channel communication signal and transmitting the sub-channel communication signal to the slave apparatus, and
wherein the slave apparatus includes a demodulation portion demodulating the sub-channel communication signal.

9. The vehicular power line communication system according to claim 8,
wherein the demodulation portion demodulates the sub-channel communication signal and receives frequency information about the first communication carrier that is set by the master apparatus and is generated by the first communication carrier generation portion.

10. The vehicular power line communication system according to claim 1,
wherein a frequency of the power feeding signal is set to be lower than a frequency of the first communication carrier and a frequency of the second communication carrier.

11. A slave apparatus to communicate with a master apparatus in a vehicle power line communication system, wherein the master apparatus includes a reference device, a power feeding signal generation portion, a first communication carrier generation portion, a communication signal generation portion, and a superimposition portion, the reference device generates a reference signal having a reference frequency, the power feeding signal generation portion divides or multiplies a frequency of the reference signal from the reference device to generate a power feeding signal, the dividing or multiplying includes dividing or multiplying by one, the first communication carrier generation portion divides or multiplies the frequency of the reference signal from the reference device to generate a first communication carrier within a frequency band that is different from a frequency band for the power feeding signal, the communication signal generation portion generates a communication signal having a data communication frequency band using the first communication carrier, the superimposition portion superimposing the communication signal from the communication signal generation portion on the power feeding signal from the power feeding signal generation portion to generate a superimposition signal, the superimposition portion transmits the superimposition signal to the slave apparatus, the slave apparatus comprising:
  a separation portion separating the superimposition signal from the superimposition portion into a power feeding signal having a frequency band for the power feeding signal generation portion and a communication signal having the data communication frequency band;
  a second communication carrier generation portion dividing or multiplying a frequency of the power feeding signal separated by the separation portion to generate a second communication carrier; and
  a modulation and demodulation portion modulating and demodulating a data communication signal to be communicated with the master apparatus using the second communication carrier.

\* \* \* \* \*